(12) United States Patent
Park

(10) Patent No.: US 9,243,775 B2
(45) Date of Patent: Jan. 26, 2016

(54) LIGHT UNIT HAVING ASYMMETRIC REFLECTOR AND ILLUMINATION SYSTEM USING THE SAME

(71) Applicant: LG INNOTEK CO., LTD., Seoul (KR)

(72) Inventor: Sung Yong Park, Seoul (KR)

(73) Assignee: LG INNOTEK, CO., LTD., Seoul (KR)

( * ) Notice: Subject to any disclaimer, the term of this patent is extended or adjusted under 35 U.S.C. 154(b) by 0 days.

(21) Appl. No.: 14/558,817

(22) Filed: Dec. 3, 2014

(65) Prior Publication Data

US 2015/0085485 A1 Mar. 26, 2015

Related U.S. Application Data

(63) Continuation of application No. 13/525,581, filed on Jun. 18, 2012, now Pat. No. 8,926,128.

(30) Foreign Application Priority Data

Feb. 15, 2012 (KR) .................. 10-2012-0015185

(51) Int. Cl.
*F21V 7/09* (2006.01)
*F21K 99/00* (2010.01)
(Continued)

(52) U.S. Cl.
CPC ... *F21V 7/09* (2013.01); *F21K 9/50* (2013.01); *G02B 6/0096* (2013.01); *G02F 1/133615* (2013.01); *G02B 6/0031* (2013.01);
(Continued)

(58) Field of Classification Search
CPC ..... F21V 7/0008; F21V 7/0025; F21V 7/005; F21V 7/0066; F21V 7/09; G02B 6/0031; G02B 6/0055; G02B 19/0066; G02B 19/0019; G02F 1/133603; G02F 1/133605; G02F 1/133615; G09F 2013/0422
USPC .......... 349/67; 362/97.1–97.4, 235, 236, 247, 362/297, 217.04, 217.05, 612, 613, 241, 362/147
See application file for complete search history.

(56) References Cited

U.S. PATENT DOCUMENTS 4,229,782 A 10/1980 Ruud et al. .................... 362/297
5,673,128 A * 9/1997 Ohta et al. ...................... 349/62
(Continued)

FOREIGN PATENT DOCUMENTS

JP 2000-011724 A 1/2000
WO WO 2009/149010 A1 12/2009
WO WO 2009149010 A1 * 12/2009

OTHER PUBLICATIONS

European Search Report dated May 23, 2013 issued in Application No. 12 17 3413.
(Continued)

*Primary Examiner* — Karabi Guharay
*Assistant Examiner* — Steven Horikoshi
(74) *Attorney, Agent, or Firm* — Ked & Associates, LLP

(57) ABSTRACT

Disclosed is a light unit and a display device using the same, the light unit which includes a first reflector comprising an inclined surface partially formed therein, second and third reflectors arranged at both ends of the first reflector, respectively, a first light source module disposed between the first and second reflectors, and a second light source module disposed between the first reflector and the third reflector, wherein a light emitting direction of the first light source module is different from a light emitting direction of the second light source module.

17 Claims, 24 Drawing Sheets

(51) Int. Cl.
*G02F 1/1335* (2006.01)
*F21V 8/00* (2006.01)

(52) U.S. Cl.
CPC ......... *G02B6/0055* (2013.01); *G02F 1/133603* (2013.01); *G02F 1/133605* (2013.01); *G02F 1/133611* (2013.01)

(56) References Cited

U.S. PATENT DOCUMENTS

| | | | |
|---|---|---|---|
| 2002/0105807 A1* | 8/2002 | Loughrey | 362/278 |
| 2007/0171626 A1* | 7/2007 | Chang | 362/97 |
| 2010/0172152 A1 | 7/2010 | Boonekamp | 362/609 |
| 2010/0321919 A1* | 12/2010 | Yang | 362/84 |
| 2011/0211335 A1* | 9/2011 | Ko | 362/97.1 |
| 2011/0267839 A1 | 11/2011 | Kang et al. | 362/609 |

OTHER PUBLICATIONS

U.S. Office Action dated Nov. 7, 2013 issued in U.S. Appl. No. 13/525,581.

U.S. Final Office Action dated Apr. 23, 2014 issued in U.S. Appl. No. 13/525,581.

European Office Action dated Jul. 11, 2014 issued in Application No. 12 173 413.1.

* cited by examiner

LIGHT UNIT HAVING ASYMMETRIC REFLECTOR AND ILLUMINATION SYSTEM USING THE SAME

CROSS-REFERENCE TO RELATED APPLICATION

This application is a Continuation of co-pending U.S. patent application Ser. No. 13/525,581 which claims priority under 35 U.S.C. §119 to Korean Application No. 10-2012-0015185 filed in Korea on Feb. 15, 2012, which is hereby incorporated in its entirety by reference as if fully set forth herein.

TECHNICAL FIELD

Embodiments of the invention may relate to a light unit and an illumination system using the same.

BACKGROUND

Generally, there may be a liquid crystal display (LCD), a plasma display panel (PDP) and the like as conventional large scale display device.

Different from a self-luminous type PDP that is, an LCD that is not self-luminous requires a light unit.

Such a light unit used in the LCD may be categorized into an edge light unit and a direct light, based on location of light sources. In the edge type, light sources are arranged on right and left edges or up and down edges of an LCD panel. Lights may be dispersed a front region uniformly, using a light guide plate. Accordingly, the edge light unit has good luminous uniformity and it may enable the panel ultra-thin.

The direct light unit is used for a 20-inch-or-more display. In the direct light unit, light sources are arranged on a backside of a panel. Accordingly, the direct light unit has an advantage of better luminous efficiency than the edge light unit and it is usually used for a large scale display that requires high brightness.

A cold cathode fluorescent lamp (CCFL) is used for the light source of the conventional edge or direct light unit.

However, an electric voltage is applied to the light unit using the CCFL constantly and quite an amount of electricity is used disadvantageously. Also, the CCFL has a disadvantage of approximately 70% of color reproduction, compared with a cathode-ray tube (CRT) and another disadvantage of environmental pollution because of mercury added thereto.

To solve such disadvantages, there have been actively in progress studies on a light unit using a light emitting diode (LED) as a substitute for the CCFL.

In case of using the LED for the light unit, a partial on/off of LED arrays may be enabled and power consumption may be reduced remarkably. A RGB LED exceeds 100% of color production specifications of National Television System Committee (NTSC) and a more vivid image quality may be provided to a consumer.

SUMMARY

Accordingly, the embodiments may provide a light unit having air-guide, not using a light guide plate but using reflectors having asymmetrical inclined surfaces, and an illumination system using the same.

The embodiments may provide a light unit having light source modules arranged asymmetrically to reduce the size of bezel, and an illumination system using the same.

In one embodiment, a light unit includes a first reflector comprising an inclined surface partially formed therein; second and third reflectors arranged at both ends of the first reflector, respectively; a first light source module disposed between the first and second reflectors; and a second light source module disposed between the first reflector and the third reflector, wherein a light emitting direction of the first light source module is different from a light emitting direction of the second light source module.

A light emitting direction of the first light source module may be perpendicular to a light emitting direction of the second light source module.

The light emitting direction of the first light source module may be toward the first reflector from the second reflector. The light emitting direction of the second light source module may be toward the second reflector from the third reflector.

The number of light sources provided in the first light source module may be different from the number of light sources provided in the second light source module.

The number of the light sources provided in the second light source module may be larger than the number of the light sources provided in the first light source module by 1.1 to 5 times.

An optical output power of light sources provided in the first light source module may be different from an optical output power of light sources provided in the second light source module.

The optical output power of the light sources provided in the second light source module may be higher than the optical output power of the light sources provided in the first light source module by 1.1 to 3 times.

The first light source module may be in contact with the second reflector and the second light source module is spaced apart a predetermined distance from the third reflector.

The length of the second reflector may be different from the length of the third reflector.

The length of the third reflector may be longer than the length of the second reflector by 1.1 to 3 times.

The second reflector may include an inclined surface partially formed in the surface facing the first light source module. The third reflector may include an inclined surface partially formed in the surface facing the second light source module.

The second reflector may have a surface facing the first light source module that may be a scattered reflection surface, and the third reflector may have a surface facing the second light source module that may be a specular reflection surface.

The first reflector may include a first region adjacent to the first light source module; and a second region adjacent to the second light source module, and an area of the first region may be different from an area of the second region.

The area of the second region may be larger than the area of the first region by 1.1 to 2 times.

The first region may include a first inclined surface inclined downwardly, adjacent to the first light source module; and a second inclined surface inclined upwardly from the first inclined surface, adjacent to the first inclined surface, and the second region may include a third inclined surface inclined downwardly, adjacent to the second light source module; and a fourth inclined surface inclined upwardly from the third inclined surface, adjacent to the third inclined surface.

The first inclined surface may be a curved surface having a first curvature radius and the second inclined surface may be a curved surface having a second curvature radius. The third inclined surface may be a curved surface having a third curvature radius and the fourth inclined surface may be a curved surface having a fourth curvature radius.

The first curvature radius may be different from the third curvature radius. The second curvature radius may be different from the fourth curvature radius.

The second curvature radius may be larger than the first curvature radius and the fourth curvature radius may be larger than the third curvature radius.

The first reflector may include a third region provided between the first region and the second region, and an area of the third region may be smaller than the areas of the first and second regions.

The third region may be a concavely curved surface, a convexly curved surface or a flat surface.

The first inclined surface may include a curved portion and a flat portion. The flat portion of the first inclined surface may be arranged in an orientation angle of a light emitted from the first light source module.

The light unit may further include an optical member disposed apart a predetermined distance from the first reflector, wherein air guide may be formed in a space formed between the first reflector and the optical member.

In another embodiment, a light unit includes a first reflector comprising first and second regions; a second reflector arranged in an end of the first region provided in the first reflector; a third reflector arranged in an end of the second region provided in the first reflector; a first light source module arranged between the first reflector and the second reflector; and a second light source module arranged between the first reflector and the third reflector, wherein an area of the second reflector is smaller than an area of the third reflector and an area of the first region provided in the first reflector is smaller than an area of the second region provided in the first reflector.

A light emitting direction of the first light source module may be toward the first reflector from the second reflector and a light emitting direction of the second light source module may be toward the second reflector from the third reflector.

BRIEF DESCRIPTION OF THE DRAWINGS

Arrangements and embodiments of the invention may be described in detail with reference to the following drawings in which like reference numerals refer to like elements and wherein.

DETAILED DESCRIPTION

Hereinafter, embodiments will be described with reference to the annexed drawings.

It will be understood that when an element is referred to as being 'on' or 'under' another element, it can be directly on/under the element, and one or more intervening elements may also be present.

When an element is referred to as being 'on' or 'under', 'under the element' as well as 'on the element' can be included based on the element.

Figure 1:
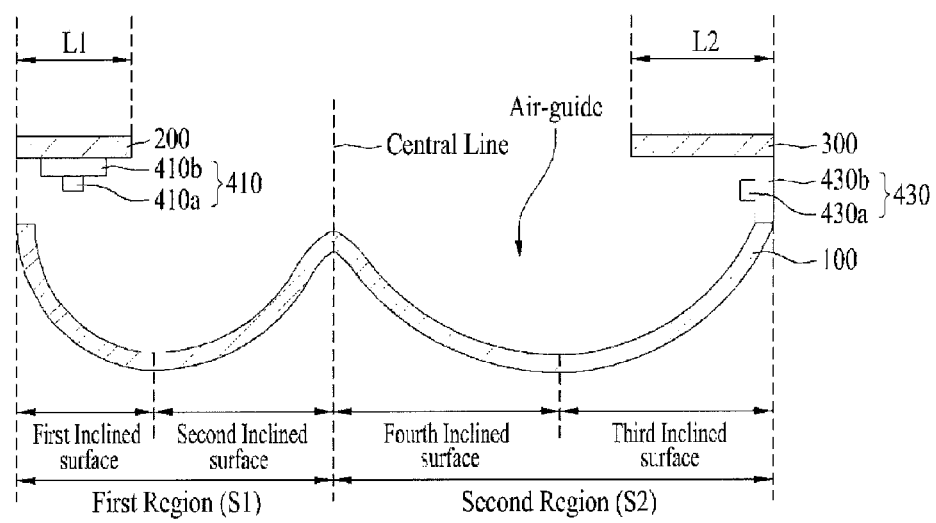
FIG. 1 is a sectional view illustrating a two-edge light unit according to an embodiment of the invention.

FIG. 1 is a sectional view illustrating a two-edge light unit according to an embodiment.

As shown in FIG. 1, a light unit may include first, second and third reflectors 100, 200 and 300 and first and second light source modules 410 and 430.

In this instance, the first reflector 100 may have an inclined surface formed in a predetermined area thereof and first and second end portions that face each other in opposite.

The second reflector 200 may be arranged at the first end portion of the first reflector and the third reflector 300 may be arranged at the second end portion of the first reflector 100.

The first light source module 410 may be disposed between the first reflector 100 and the second reflector 200. The second light source module 430 may be disposed between the first reflector 100 and the third reflector 300.

In this instance, a light projecting direction of the first light source module 410 may be different from a light projecting direction of the second light source module 430.

For example, the light projecting direction of the first light source module 410 may be perpendicular to that of the second light source module 430.

In other words, the light projecting direction of the first light source module 410 may be vertical toward the first reflector 100 from the second reflector 200. The light projecting direction of the second light source module 430 may be horizontal toward the second reflector 200 from the third reflector 300.

The first light source module 410 may include a first substrate 410b having an electrode pattern and at least one first light source 410a arranged on the first substrate 410b.

In this instance, the first light source 410a of the first light source module 410 may be a top view type light emitting diode.

Alternatively, the first light source 410a may be a side view type light emitting diode.

The first substrate 410b may be disposed on the second reflector 200 along a first direction.

Also, the first substrate 410b may be a printed circuit board (PCB) formed of a selected material from polyethylene terephtalate (PET), glass, polycarbonate (PC) and silicon (Si), or the substrate may be a film.

Alternatively, the substrate 410b may be a unilayered PCB, a multilayered PCB, a ceramic substrate or a metal core PCB selectively.

In this instance, a reflection coating film or a reflection coating material layer may be formed on the substrate 410b, and the substrate 410b may reflect the light generated from the first light source 410a toward the first reflector 100.

The first light source 410a may be a light emitting diode (LED) chip and the LED chip may be configured of a blue LED chip, an ultraviolet light LED chip or it may be configured of a package combined with one or more of red, green, blue, yellow green and white LED chips.

The white LED may be realized by combining a yellow phosphor on the blue LED or combining a red phosphor and a green phosphor on the blue LED, or by simultaneously using a yellow phosphor, a red phosphor and a green phosphor on the blue LED.

In addition, the second light source module 430 may include a second substrate 430b having an electrode pattern and at least one second light source 430a arranged on the second substrate 430b.

The second substrate 430b may be arranged on the third reflector 200 along a different direction from the first direction.

In this instance, the second light source 430a of the second light source module 430 may be a top view type light emitting diode.

Alternatively, the second light source may be a side view type light emitting diode.

The second substrate 430b and the second light source 430a of the second light source module 430 may be identical to the first substrate 410b and the first light source 410a of the first light source module 410. Accordingly, detailed description thereof will be omitted.

The first light source module 410 may be positioned between the first reflector 100 and the second reflector 200. The first light source module 410 may contact with the second reflector 200 and it may be spaced apart a predetermined distance from the first reflector 100 simultaneously.

Alternatively, the first light source 410 may be spaced apart a predetermined distance from the first reflector 100 and the second reflector 200, or it may simultaneously contact with the first reflector 100 and the second reflector 200.

The second light source module 430 may be positioned between the first reflector 100 and the third reflector 300, with being adjacent to the third reflector 300.

Alternatively, the second light source module 430 may contact with the third reflector 300, simultaneously with being spaced apart a predetermined distance from the first reflector 100, or it may contact with the first reflector, with being spaced apart a predetermined distance from the third reflector 300.

The second light source module 430 may be spaced apart a predetermined distance from the first reflector 100 and the third reflector 300 or it may simultaneously contact with the first reflector 100 and the third reflector 300.

The first reflector 100 and the second reflector 200 may be facing each other, spaced apart a predetermined distance, to have an air guide in an empty space between them.

The first reflector 100 and the third reflector 300 may be facing each other, spaced apart a predetermined distance, to have an air guide in an empty space between them.

The second reflector 200 and the third reflector 300 may be formed of a reflection coating film or a reflection coating material and, it may reflect the lights generated from the first and second light source modules 410 and 430 toward the first reflector 100.

Saw-like reflection patterns may be formed on surfaces of the second and third reflectors 200 and 300, respectively, and the surfaces may face the first and second light source modules 410 and 430, respectively. A surface of the reflection pattern may be flat or curved.

The reason why the reflection pattern is formed on the surfaces of the second and third reflectors 200 and 300 is to increase brightness in a center region of the light unit by reflecting the lights generated in the first and second light source modules 410 and 430 to the center region of the first reflector 100.

The length (L1) of the second reflector 200 may be different from the length (L2) of the third reflector 300.

In this instance, the length (L1) of the second reflector 200 is the distance between lateral surfaces located toward the second light source module 430 from the first light source module 410. The length (L2) of the third reflector 300 is the distance between lateral surfaces located toward the first light source 410 from the second light source module 430.

In this instance, the length (L1) of the second reflector 200 may be shorter than the length (L2) of the third reflector 300.

This is because a light emitting direction of the first light source module 410 is directly toward the first reflector 100.

Accordingly, the length (L1) of the second reflector 200 may be reduced and a bezel region positioned at an edge of a screen on the display device may be reduced.

For example, the length (L2) of the third reflector 300 may be longer than the length (L1) of the second reflector approximately by 1.1 to 3 times.

If the length (L2) of the third reflector 300 is too short, hot spots might be generated. If the length (L2) is too long, a bezel region might be larger.

An area of the second reflector 200 may be different from an area of the third reflector 300 on a case-by-case basis.

In this instance, the area of the second reflector may be smaller than that of the third reflector 300.

Hence, the first reflector 100 may include a first region having an inclined surface formed in a predetermined portion thereof and a second region having an inclined surface partially formed in a predetermined portion thereof.

In this instance, the inclined surfaces of the first and second regions may be asymmetrical.

For example, an area (S1) of the first region may be different from an area (S2) of the second region with respect to a central line of the first reflector 100.

Alternatively, the area (S1) of the first region may be smaller than the area (S2) of the second region in the first reflector 100.

Also, the first region of the first reflector 100 may include first and second inclined surfaces. The second region of the first reflector 100 may include third and fourth inclined surfaces.

The first inclined surface may be aligned with the first light source module 410 and the second reflector 200, with being inclined downwardly. The second inclined surface may be adjacent to the first inclined surface, with being inclined upwardly from the first inclined surface.

The fourth inclined surface may be adjacent to the second inclined surface, with being inclined downwardly from the second inclined surface. The third inclined surface may be aligned with the second light source module 430 and the third reflector 300, and it may be adjacent to the forth inclined surface, with being inclined upwardly from the fourth inclined surface.

In this instance, an area (S11) of the first inclined surface may be different from an area (S12) of the second inclined surface. For example, the area (S11) of the first inclined surface may be smaller than the area (S12) of the second inclined surface.

Also, an area (S13) of the third inclined surface may be different from an area (S14) of the fourth inclined surface. For example, the area (S13) of the third inclined surface may be smaller than the area (S14) of the fourth inclined surface.

The first inclined surface may be a curvature having a first radius (R1) and the second inclined surface may be a curvature having a second radius (R2). The third inclined surface may be a curvature having a third radius (R3) and the fourth inclined surface may be a curvature having a fourth radius (R4).

In this instance, the first curvature radius (R1) may be different from the third curvature radius (R3).

For example, the first curvature radius (R1) of the first inclined surface in the first region may be smaller than the third curvature radius (R3) of the third inclined surface in the second region.

The second curvature radius (R2) of the second inclined surface may be different from the fourth curvature radius (R4). For example, the second curvature radius (R2) of the second inclined surface in the first region may be smaller than the fourth curvature radius (R4) of the fourth inclined surface in the second region.

In addition, at least one of the first, second, third and fourth inclined surfaces may be a concave curvature or a convex curvature.

Also, the first curvature radius (R1) of the first inclined surface may be different from the second curvature radius (R2) of the second inclined surface. For example, the first curvature radius (R1) of the first inclined surface in the first region may be smaller than the second curvature radius (R2) of the second inclined surface in the first region.

The third curvature radius (R3) of the third inclined surface may be different from the fourth curvature radius (R4) of the fourth inclined surface. For example, the third curvature radius (R3) of the third inclined surface may be smaller than the fourth curvature radius (R4) of the fourth inclined surface in the second region.

The areas and curvatures located in the first region of the first reflector may be asymmetrical with the areas and curvatures located in the second region of the first reflector 100.

A specular reflection sheet for reflecting lights specular may be formed in each of first and third inclined surfaces in the first reflector 100. At least one of specular and scattered reflection sheets for reflecting lights specular and scattered may be formed in each of the second and fourth inclined surfaces in the first reflector 100.

The reason why the specular reflection sheet is formed in each of the first and third inclined surfaces of the first reflector 100 is that uniform brightness can be provided to the central region by reflecting lights to the central region having weak brightness in the first reflector 100.

Also, the reason why the scattered reflection sheet is formed in each of the second and fourth inclined surfaces in the first reflector 100 is that brightness can be compensated by reflecting lights scatteredly at the second and fourth inclined surfaces in the first reflector 100.

The first reflector 100 may include metal or metallic oxide having a high reflectance such as Al, Au or TiO2. The materials composing the first, second, third and fourth inclined surfaces of the first reflector 100 may be different from each other. Surface roughness values of the first to fourth inclined surfaces may be different from each other.

In other words, the first, second and third inclined surfaces provided in the first reflector 100 may be formed of the same material, with different surface roughness values, respectively.

Alternatively, the first, second, third and fourth inclined surfaces provided in the first reflector 100 may be formed of different materials, respectively, with different surface roughness values.

As a result, the first and second light source modules may be arranged asymmetrically, to reduce the size of the bezel and to provide uniform brightness simultaneously.

Figure 2:
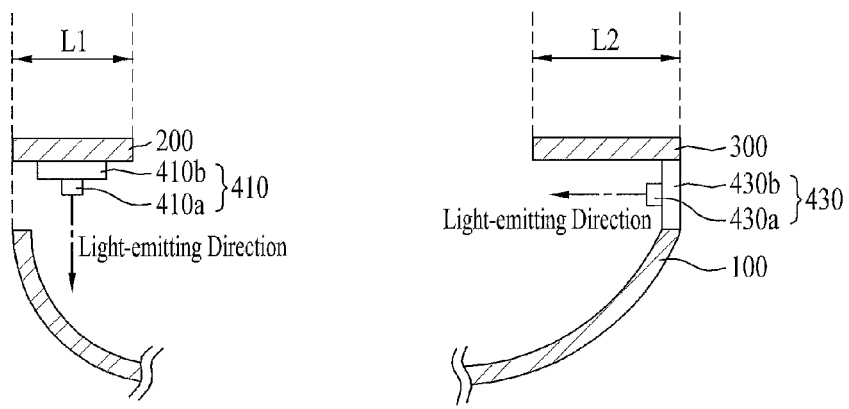
FIG. 2 is a sectional view illustrating light emitting directions of first and second light source modules.

FIG. 2 is a sectional view illustrating the light emitting direction of the first and second light source modules.

As shown in FIG. 2, the first light source module 410 may be arranged between the first reflector 100 and the second reflector 200. The second light source module 430 may be arranged between the first reflector 100 and the third reflector 300.

In this instance, the light emitting direction of the first light source module 410 may be different from that of the second light source module 430.

For example, the light emitting direction of the first light source module 410 may be perpendicular to that of the second light source module 430.

In other words, the first light source module 410 may include the first substrate 410b and the first light source 410a. A light emitting direction of the first may be perpendicular toward the first reflector 100 from the second reflector.

The second light source module 430 include the second substrate 430b and the second light source 430a. A light emitting direction of the second light source 430a may be horizontal toward the second reflector 200 from the third reflector 300.

At this time, the length (L1) of the second reflector 200 that covers the first light source module 410 may be shorter than the length (L2) of the third reflector 300 that covers the second light source module 430.

In this instance, the length (L1) of the second reflector 200 may be the distance between both lateral surfaces located toward the second light source module 430 from the first light source module 410. The length (L2) of the third reflector 300 may be the distance between both lateral surfaces located toward the first light source module 410 from the second light source module 430.

For example, the length (L2) of the third reflector 300 may be longer than the length (L1) of the second reflector 200 by approximately 1.1 to 3 times.

If the length (L2) of the third reflector 300 is too short, a hot spot might be generated. If the length (L2) of the third reflector 300 is too long, the bezel region might be enlarged.

When the light emitting direction of the first light source 410a is vertical toward the first reflector 100 from the second reflector 200, the length (L1) of the second reflector 200 can be reduced and a bezel region located in an edge area of a screen on the display device may be reduced accordingly.

Figure 3A:
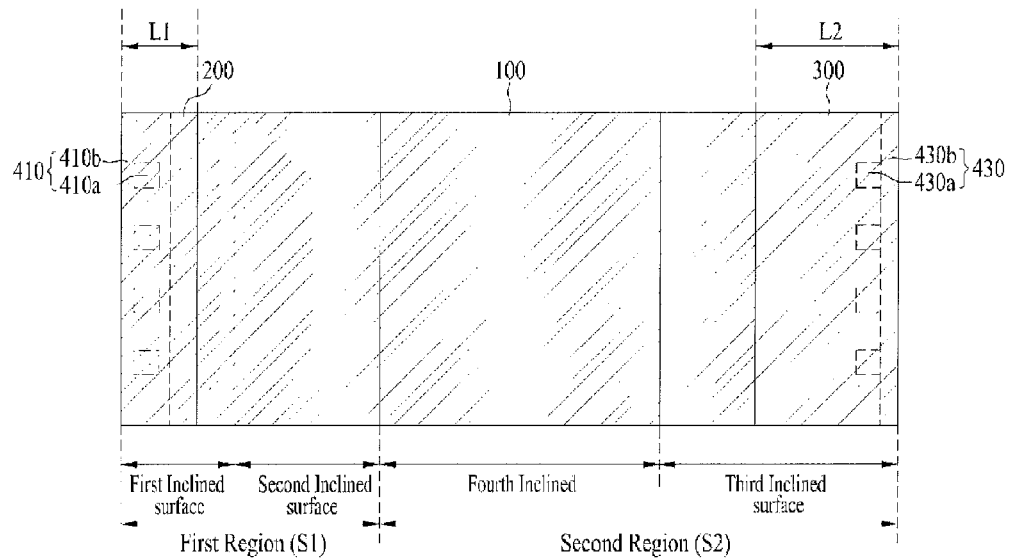
FIGS. 3a to 3c are plane views illustrating the number of light sources provided in each of the first and second light source modules.
Figure 3B:
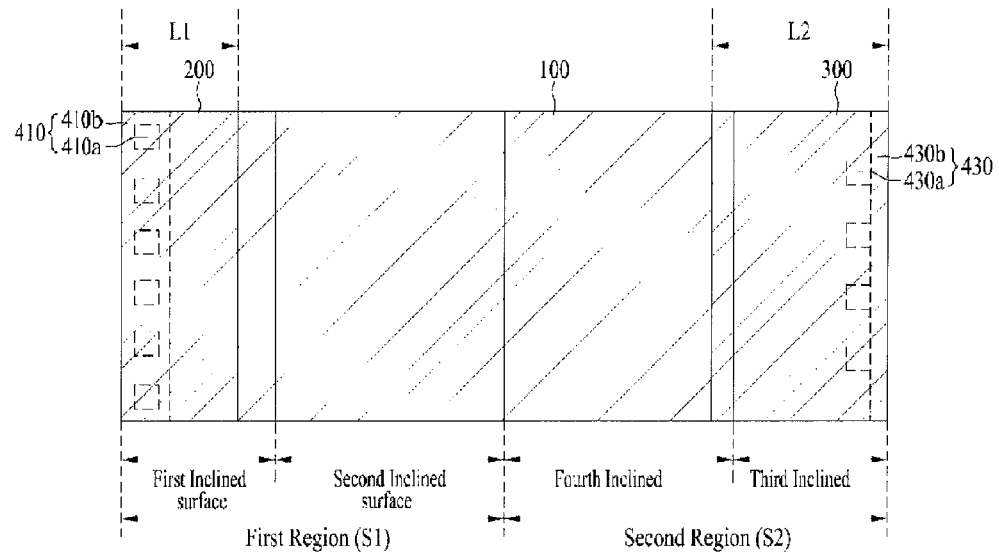
Figure 3C:
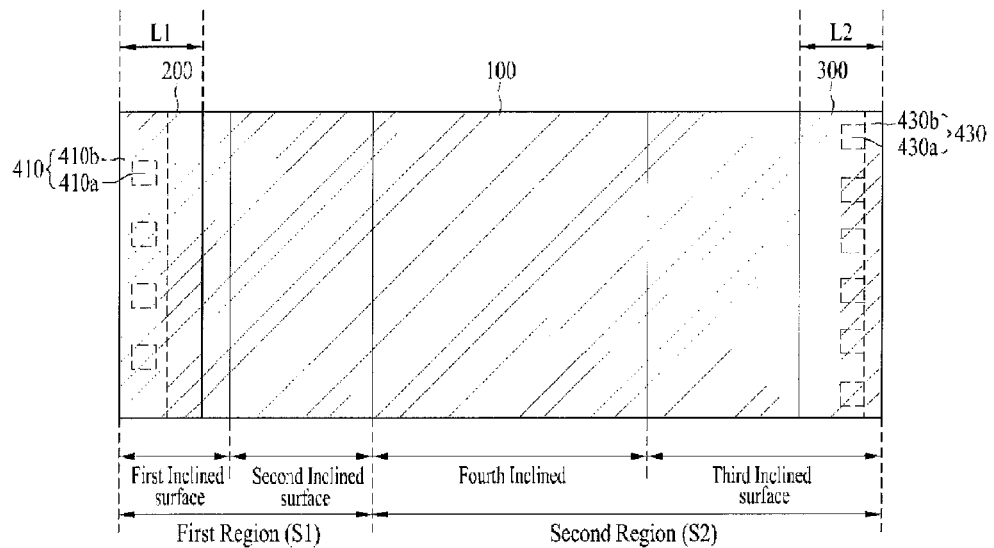

FIGS. 3a to 3c are plane views illustrating the number of light sources provided in the first and second light source modules.

FIG. 3a shows an embodiment that the number of the first light sources 410a provided in the first light source module 410 is identical to the number of the second light sources 430a provided in the second light source module 430. As shown in FIG. 3a, the first light source module 410 may be arranged between the first reflector and the second reflector 200. The second light source module 430 may be arranged between the first reflector 100 and the third reflector 300.

In this instance, the first light source module 410 includes the first substrate 410b and the first light source 410a. The light emitting direction of the first light source 410a may be vertical toward the first reflector 100 from the second reflector 200.

The second light source 430 includes the second substrate 430b and the second light source 430a. The light emitting direction of the second light source 430a may be horizontal toward the second reflector 200 from the third reflector 300.

At this time, the number of the first light sources 410a provided in the first light source module 410 may be identical to the number of the second light sources 430a provided in the second light source module 430.

The length (L1) of the second reflector 200 that covers the first light source module 410 may be shorter than the length (L2) of the third reflector 300 that covers the second light source module 430.

The first reflector 100 may include a first region adjacent to the first light source module 410 and a second region adjacent to the second light source module 430.

In this instance, an area (S1) of the first region may be smaller than an area (S2) of the second region in the first reflector 100.

The first region of the first reflector 100 may include a first inclined surface and a second inclined surface. The second region of the first reflector 100 may include a third inclined surface and a fourth inclined surface.

In this instance, an area (S11) of the first inclined surface may be smaller than an area (S12) of the second inclined surface. An area (S13) of the third inclined surface may be smaller than an area (S14) of the fourth inclined surface.

FIG. 3b shows an embodiment that the number of the first light sources 410a provided in the first light source modules 410 is larger than the number of the second light sources 430a provided in the second light source module 430. As shown in FIG. 3b, the number of the first light sources 410a provided in the first light source module 410 may be larger than the number of the second light sources 430a provided in the second light source module 430.

In this instance, the number of the first light sources 410a provided in the first light source module 410 may be larger than the number of the second light sources 430a provided in the second light source module 430 by approximately 1.1 to 5 times.

Also, the length (L1) of the second reflector 200 that covers the first light source module 410 may be shorter than the length (L2) of the third reflector 300 that covers the second light source module 430.

The first reflector 100 may include a first region adjacent to the first light source module 410 and a second region adjacent to the second light source module 430.

An area (S1) of the first region may be identical to an area (S2) of the second region in the first reflector 100.

This is because the number of the first light sources 410a provided in the first light source module 410 is larger than the number of the second light sources 430a provided in the second light source module 430. Accordingly, uniform brightness may be provided by forming the area (S1) of the first region that is the same as the area (S2) of the second region.

The first region of the first reflector 100 may include a first inclined surface and a second inclined surface. The second region of the first reflector 100 may include a third inclined surface and a fourth inclined surface.

In this instance, an area (S11) of the first inclined surface may be smaller than an area (S12) of the second inclined surface. An area (S13) of the third inclined surface may be smaller than an area (S14) of the fourth inclined surface.

FIG. 3c shows an embodiment that the number of the first light sources 410a provided in the first light source modules 410 is smaller than the number of the second light sources 430a provided in the second light source module 430. As shown in FIG. 3c, the number of the first light sources 410a provided in the first light source module 410 may be smaller than the number of the second light sources 430a provided in the second light source module 430.

In this instance, the number of the second light sources 430a provided in the second light source module 430 may be larger than the number of the first light sources 410a provided in the first light source module 410 by approximately 1.1 to 5 times.

Also, the length (L1) of the second reflector 200 that covers the first light source module 410 may be identical to the length (L2) of the third reflector 300 that covers the second light source module 430.

Since the number of the second light sources 430a provided in the second light source module 430 is larger than the number of the first light sources 410a provided in the first light source module 410, the length (L1) of the second reflector 200 can be formed identical to the length (L2) of the third reflector 300 and uniform brightness can be provided accordingly.

The first reflector 100 may include a first region adjacent to the first light source module 410 and a second region adjacent to the second light source module 430.

In this instance, an area (S1) of the first region may be smaller than an area (S2) of the second region in the first reflector 100.

The first region of the first reflector 100 may include a first inclined surface and a second inclined surface. The second region of the first reflector 100 may include a third inclined surface and a fourth inclined surface.

In this instance, an area (S11) of the first inclined surface may be smaller than an area (S12) of the second inclined surface. An area (S13) of the third inclined surface may be smaller than an area (S14) of the fourth inclined surface.

According to the number of the first and second light source module, the lengths of the first and second reflectors 200 and 300 may be variable and the areas of the first and second regions provided in the first reflector 100 may be variables.

Figure 4A:
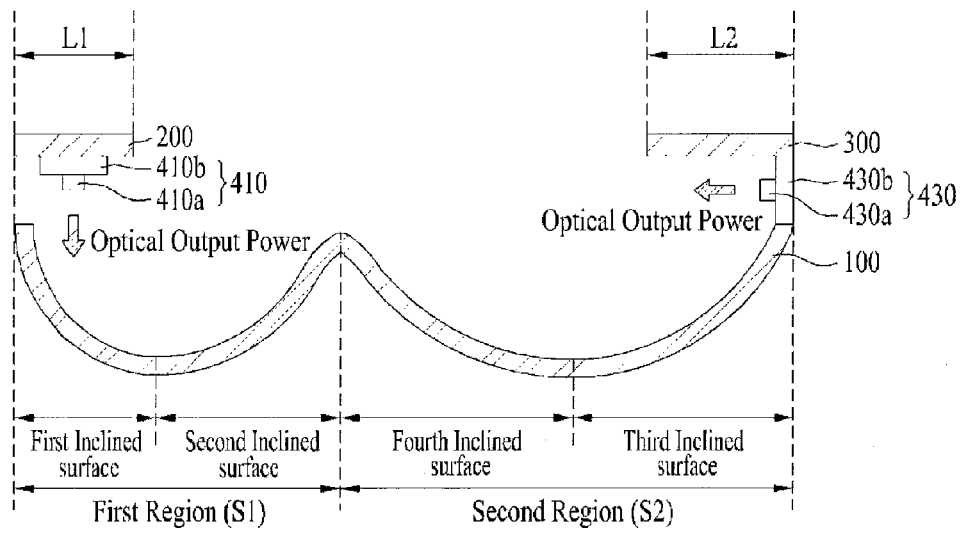
FIGS. 4a to 4c are sectional views illustrating the optical output power of the light sources provided in the first and second light source modules.
Figure 4B:
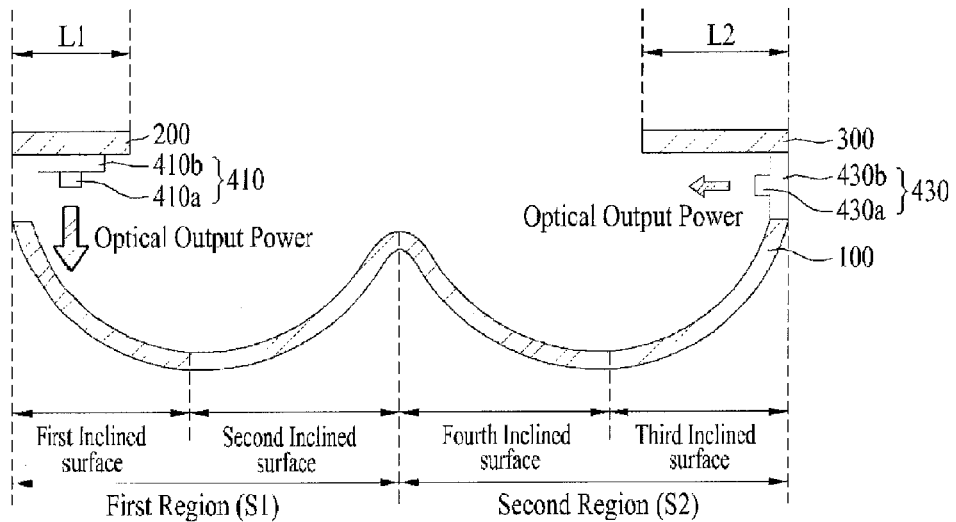
Figure 4C:
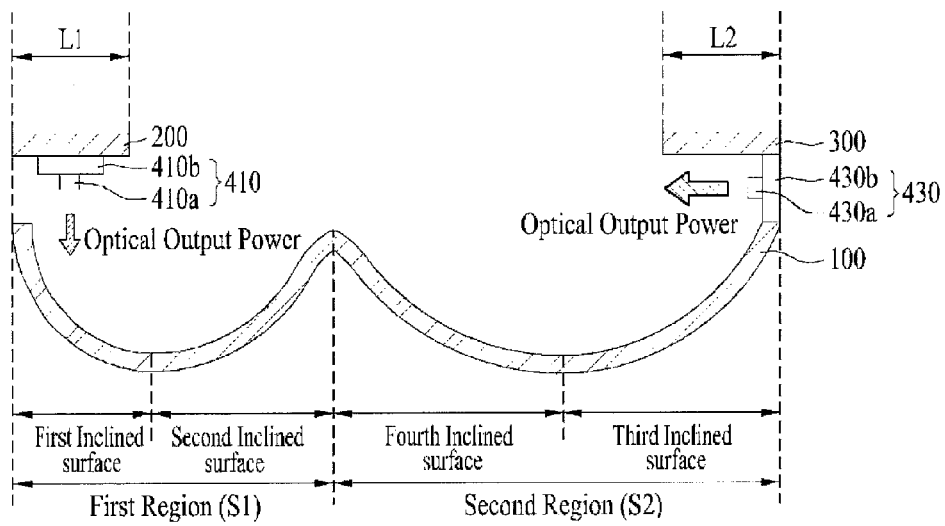

FIGS. 4a to 4c are sectional views illustrating the optical output power of the light sources provided in the first and second light source modules.

FIG. 4a shows an embodiment that the optical output power of the first light source 410 provided in the first light source module 410 is identical to that of the second light source 430a provided in the second light source module 430. As shown in FIG. 4a, the first light source module 410 may be arranged between the first reflector 100 and the second reflector 200. The second light source module 430 may be arranged between the first reflector 100 and the third reflector 300.

In this instance, the first light source module 410 includes the first substrate 410b and the first light source module 410a. A light emitting direction of the first light source 410a may be vertical toward the first reflector 100 from the second reflector 200.

The second light source module 430 includes the second substrate 430b and the second light source 430a. A light emitting direction of the second light source 430a may be horizontal toward the second reflector 200 from the third reflector 300.

At this time, the optical output power of the first light source 410a provided in the first light source module 410 may be identical to the optical output power of the second light source 430a provided in the second light source module 430.

Also, the length (L1) of the second reflector 200 that covers the first light source module 410 may be shorter than the length (L2) of the third reflector 300 that covers the second light source module 430.

The first reflector 100 may include a first region adjacent to the first light source module 410 and a second region adjacent to the second light source module 430.

An area (S1) of the first region may be smaller than an area (S2) of the second region in the first reflector 100.

The first region of the first reflector 100 may include a first inclined surface and a second inclined surface. The second region of the first reflector 100 may include a third inclined surface and a fourth inclined surface.

In this instance, an area (S11) of the first inclined surface may be smaller than an area (S12) of the second inclined surface. An area (S13) of the third inclined surface may be smaller than an area (S14) of the fourth inclined surface.

FIG. 4b shows an embodiment that the optical output power of the first light source module 410 provided in the first light source module 410 is higher than that of the second light source 430a provided in the second light source module 430. As shown in FIG. 4b, the optical output power of the first light source 410a provided in the first light source module 410 may be higher than that of the second light source 430a provided in the second light source module 430.

In this instance, the optical output power of the first light source 430a provided in the first light source module 410 may be higher than that of the second light source 430a provided in the second light source module 430 by 1.1 to 3 times.

The length (L1) of the second reflector 200 that covering the first light source module 410 may be shorter than the length (L2) of the third reflector 300 that covers the second light source module 430.

The first reflector 100 may include a first region adjacent to the first light source module 410 and a second region adjacent to the second light source module 430.

In this instance, an area (S1) of the first region may be identical to an area (S2) of the second region in the first reflector 100.

Since the optical output power of the first light sources 410a provided in the first light source module 410 is higher than the optical output power of the second light sources 430a provided in the second light source module 430, uniform brightness can be provided by forming the area (S1) of the first reflector 100 identical to the area (S2) of the second reflector 200.

Also, the first region of the first reflector 100 may include a first inclined surface and a second inclined surface. The second region of the first reflector 100 may include a third inclined surface and a fourth inclined surface.

In this instance, an area (S11) of the first inclined surface may be smaller than an area (S12) of the second inclined surface. An area (S13) of the third inclined surface may be smaller than an area (S14) of the fourth inclined surface.

FIG. 4c shows an embodiment that the optical output power of the first light source module 410 provided in the first light source module 410 is lower than that of the second light source 430a provided in the second light source module 430. As shown in FIG. 4c, the optical output power of the first light source 430a provided in the first light source module 410 may be lower than that of the second light source 430a provided in the second light source module 430.

In this instance, the optical output power of the second light source 430a provided in the first light source module 430 may be higher than that of the second light source 410a provided in the second light source module 410 by 1.1 to 3 times.

The length (L1) of the second reflector 200 that covering the first light source module 410 may be identical to the length (L2) of the third reflector 300 that covers the second light source module 430.

Since the optical output power of the second light sources 430a provided in the second light source module 430 is higher than the optical output power of the first light sources 410a provided in the first light source module 410, uniform brightness can be provided by forming the length (L1) of the second reflector 200 identical to the length (L2) of the third reflector 300.

The first reflector 100 may include a first region adjacent to the first light source module 410 and a second region adjacent to the second light source module 430.

In this instance, an area (S1) of the first region may be smaller than an area (S2) of the second region in the first reflector 100.

Also, the first region of the first reflector 100 may include a first inclined surface and a second inclined surface. The second region of the first reflector 100 may include a third inclined surface and a fourth inclined surface.

In this instance, an area (S11) of the first inclined surface may be smaller than an area (S12) of the second inclined surface. An area (S13) of the third inclined surface may be smaller than an area (S14) of the fourth inclined surface.

According to the optical output powers of the first and second light source modules 410 and 430, the lengths of the second and third reflectors 200 and 300 may be variable and the areas of the first and second regions provided in the first reflector 100 may be variable.

Figure 5A:
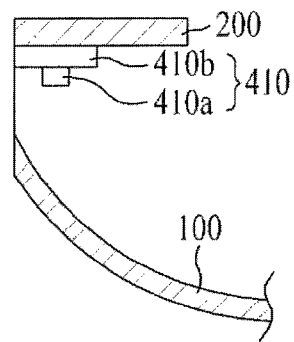
FIGS. 5a to 5c are sectional views illustrating a position of the first light source module.
Figure 5B:
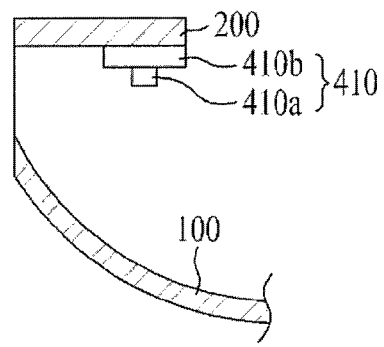
Figure 5C:
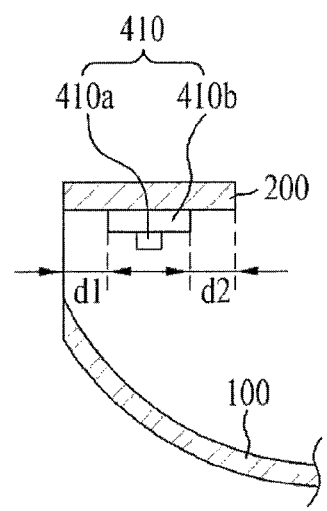

FIGS. 5a to 5c are sectional views illustrating the position of the first light source module.

As shown in FIGS. 5a to 5c, the first light source module 410 may be arranged on a surface of the second reflector that faces the first reflector 100.

The first light source module 410 may include the first substrate 410b and the first light source 410a. A light emitting surface of the first light source 410a may be arranged toward the first reflector 100 and the first substrate 410b may be arranged to contact with the second reflector 200.

The second reflector 200 may include a first edge region facing an end of the first reflector 100, a central region adjacent to the first edge region and a second edge region adjacent to the central region.

As shown in FIG. 5a, the first light source module 410 may be arranged on the first edge region of the second reflector 200. As shown in FIG. 5b, it may be arranged on the second edge region of the second reflector 200.

As shown in FIG. 5c, the first light source module 410 may be arranged on the central region of the second reflector 200.

For example, the first light source module 410 may be spaced apart a predetermined distance (d1) from a first side of the second reflector 200 and it may be spaced apart a predetermined distance (d2) from a second side of the second reflector 200.

In this instance, the distance (d1) may be identical to the distance (d2) or d1 may be different from d2.

FIGS. 6a to 6d are sectional views illustrating a position of the second light source module.

Figure 6A:
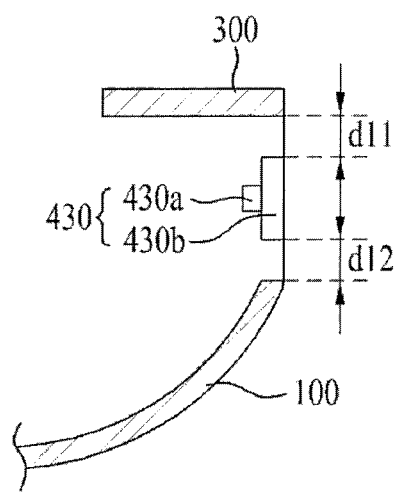
FIGS. 6a to 6d are sectional views illustrating a position of the second light source module.
Figure 6B:
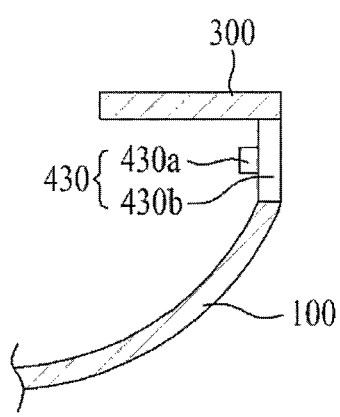
Figure 6C:
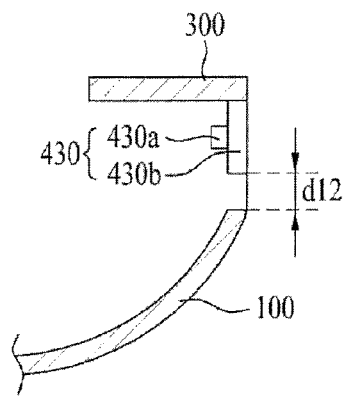
Figure 6D:
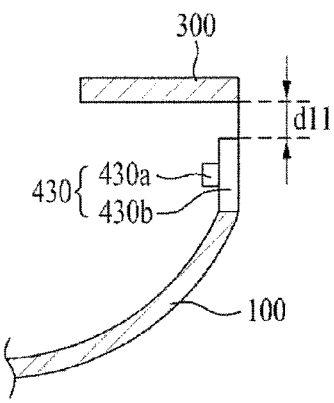

FIG. 6a is a diagram illustrating the second light source module 430 spaced apart a predetermined distance from the third reflector 300. FIG. 6b is a diagram illustrating the second light source module 430 contacting with the first reflector 100 and the third reflector 300 simultaneously. FIG. 6c is a diagram illustrating the second light source module 430 spaced apart a predetermined distance from the first reflector 100, in contact with the third reflector 300 simultaneously. FIG. 6d is a diagram illustrating the second light source module spaced apart a predetermined distance from the third reflector 300, in contact with the first reflector 100 simultaneously.

As shown in FIG. 6a, the first light source module 430 may be spaced apart a predetermined distance (d11) from the third reflector 300 and another predetermined distance (d12) from the first reflector 100.

In this instance, the distance (d11) may be identical to or different from the distance (d12).

For example, the distance (d11) may be shorter than the distance (d12).

If d11 is longer than d12, a hot spot might be generated.

As shown in FIG. 6b, the second light source module 430 may in contact with the first reflector 100 and the third reflector 300.

The hot spot mentioned above may be prevented by contacting the second light source module 430 with the first and third reflectors 100 and 300. The lights may be transmitted to a farther region from the second light source module 430 and the overall thickness of the light unit may be reduced.

As shown in FIG. 6c, the second light source module 430 may be in contact with the third reflector 300 and it may be spaced apart a predetermined distance (d12) from the first reflector 100.

In this instance, the hot spot may be prevented by contacting the second light source module 430 with the third reflector 300 and the lights can be transmitted to a farther region from the second light source module 430.

As shown in FIG. 6d, the second light source module 430 may be in contact with the first reflector 100 and it may be spaced apart a predetermined distance (d11) from the third reflector 300.

Figure 7A:
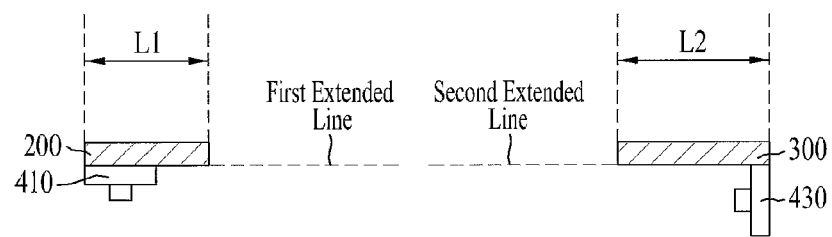
FIGS. 7a to 7c are sectional views illustrating the lengths of second and third reflectors.
Figure 7B:
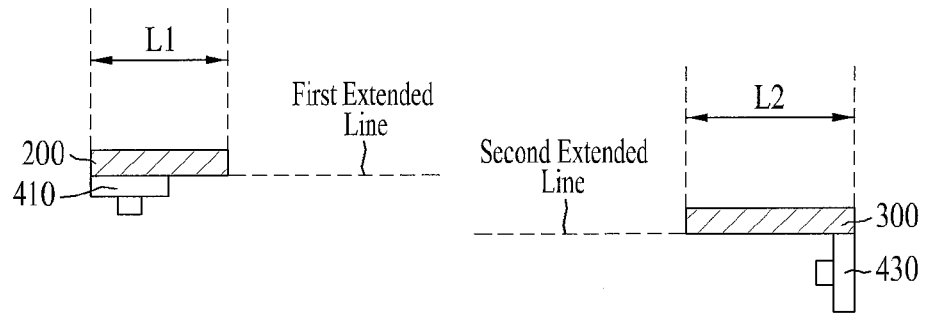
Figure 7C:
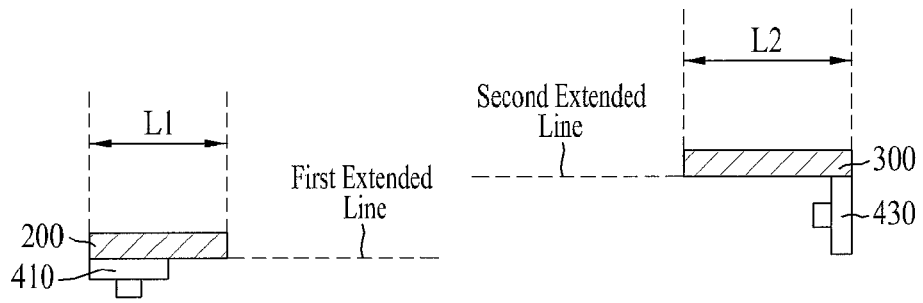

FIGS. 7a to 7c are sectional views illustrating the lengths of the second and third reflectors.

As shown in FIGS. 7a to 7c, the second reflector 200 may cover the first light source module 410 and the third reflector 300 may cover the second light source module 430.

In this instance, a light emitting direction of the first light source module 410 may be perpendicular to a light emitting direction of the second light source module 430.

In other words, the light emitting direction of the first light source module 410 may be vertical downwardly from the second reflector 200.

The light emitting direction of the second light source module 430 may be horizontal toward the second reflector 200 from the third reflector 300.

At this time, the length (L1) of the second reflector 200 covering the first light source module 410 may be shorter than the length (L2) of the third reflector 300 covering the second light source module 430.

The length (L1) of the second reflector 200 may be the distance between both lateral surfaces located toward the second light source module 430 from the first light source module 410. The length (L2) of the third reflector 300 may be the distance between both lateral surfaces located toward the first light source module 410 from the second light source module 430.

For example, the length (L2) of the third reflector 300 may be longer than the length (L1) of the second reflector 200 by approximately 1.1 to 3 times.

If the length (L2) of the third reflector 300 is too short, the hot spot might be generated. If the length (L2) of the third reflector 300 is too long, the bezel region might be increased.

When the light emitting direction of the first light source 410a is vertical downwardly from the second reflector 200, the length (L1) of the second reflector 200 can be shortened and the bezel region located in the edge area on the screen of the display device may be reduced accordingly.

As shown in FIG. 7a, the second reflector 200 and the third reflector 300 may be arranged on the same line. As shown in FIGS. 7b and 7c, they may be arranged on different lines.

For example, as shown in FIG. 7a, the second reflector 200 and the third reflector 300 may be arranged with the same height, to connect a first extended line from a surface of the second reflector 200 and a second extended line extended from a surface of the third reflector 300 with each other.

Alternatively, as shown in FIGS. 7b and 7c, the second reflector 200 and the third reflector 300 may be arranged with different heights, respectively, to make the first extended line from the surface of the second reflector 200 and the second extended line from the surface of the third reflector 300 miss each other.

FIGS. 8a to 8e are sectional views illustrating the thickness of the second reflector.

As shown in FIGS. 8a to 8e, a back surface of the second reflector 200 may include an eleventh region and a twelfth region. The first light source module 410 may be arranged on the eleventh region of the second reflector 200.

The twelfth region of the second reflector 200 may have an inclined surface inclined a predetermined angle.

The inclination angle (θ) of the inclined surface may be approximately 1 to 85 degrees with respect to a top surface of the second reflector 200.

Accordingly, the thickness of the second reflector 200 may be gradually decreasing or increasing from the first light source module 410.

Figure 8A:
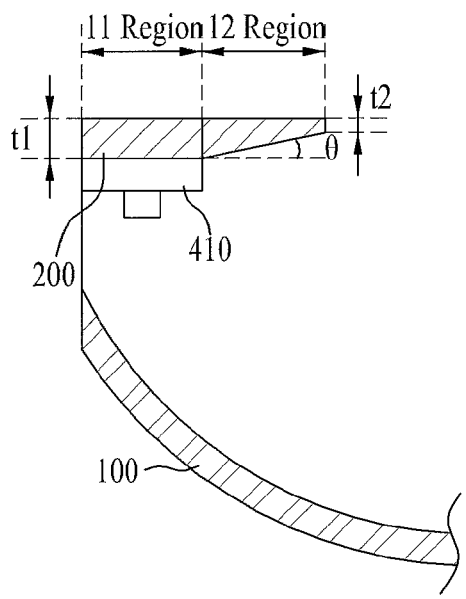
FIGS. 8a to 8e are sectional views illustrating the thickness of the second reflector.
Figure 8B:
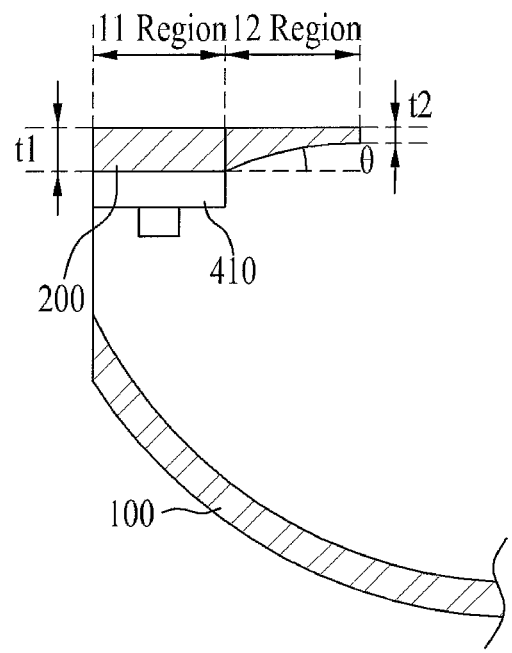

In other words, the second reflector 200 may have a thickness (t1) near the first light source module 410 and another thickness (t2) far from the first light source module 410 that is different from the thickness (t1). As shown in FIGS. 8a and 8b, the thickness (t1) of the region near the first light source module 410 may be larger than the thickness (t2) of another region far from the first light source module 410.

Figure 8C:
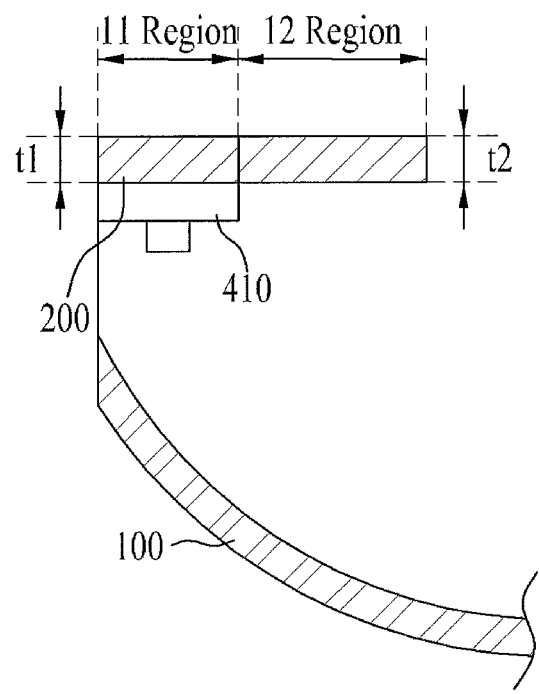
Figure 8D:
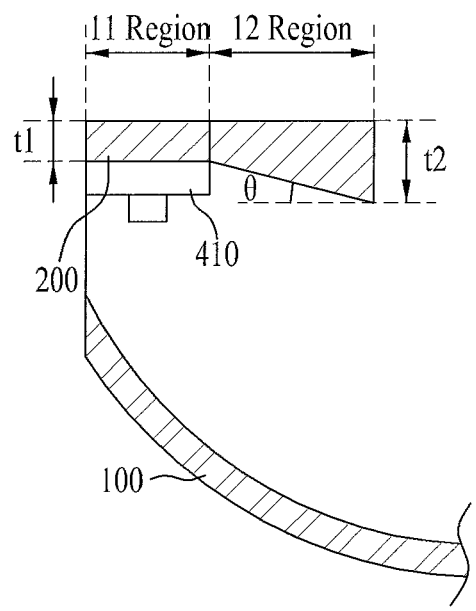
Figure 8E:
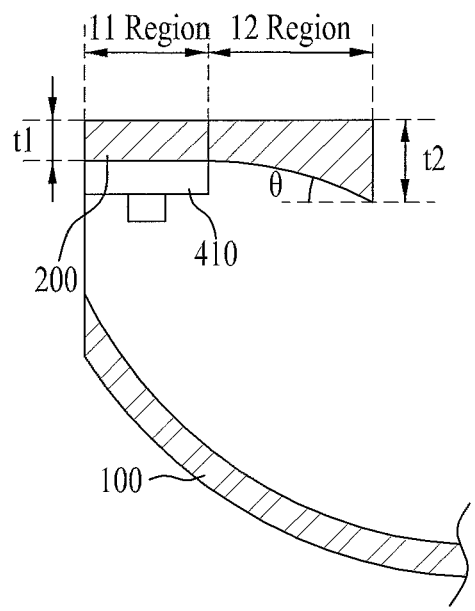

Alternatively, as shown in FIGS. 8d and 8e, the thickness (t1) near the first light source module 410 may be smaller than another thickness (t2) far from the first light source module 410.

As shown in FIG. 8c, the thickness (t1) of the region near the first light source module 410 may be identical to the thickness (t2) of the region far from the first light source module 410 in the second reflector 200.

A predetermined reflection pattern may be formed in the twelfth region of the second reflector 200.

FIGS. 9a to 9e are sectional views illustrating the thickness of the third reflector.

As shown in FIGS. 9a to 9e, a back surface of a back surface of the third reflector 300 may include a thirteenth region and a fourteenth region. The second light source module 430 may be arranged on the thirteenth region of the third reflector 300.

The fourteenth region of the third reflector 300 may have an inclined surface inclined a predetermined angle.

The inclination angle (θ) of the inclined surface may be approximately 1 to 85 degrees with respect to a top surface of the third reflector 300.

Accordingly, the thickness of the third reflector 300 may be gradually decreasing or increasing from the second light source module 430.

Figure 9A:
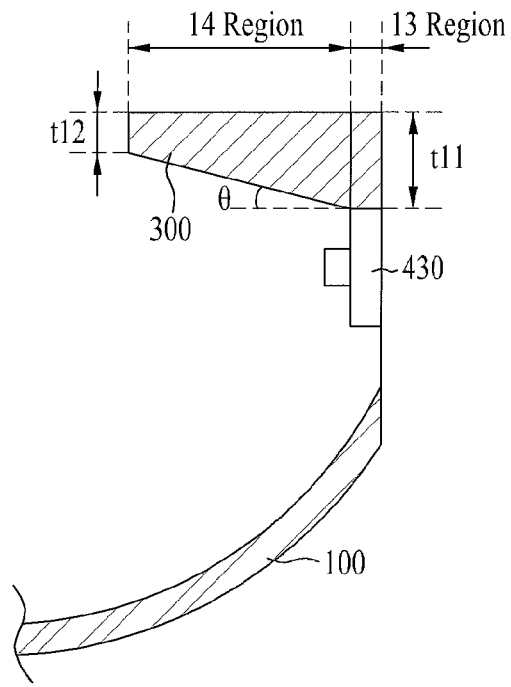
FIGS. 9a to 9e are sectional views illustrating the thickness of the third reflector.
Figure 9B:
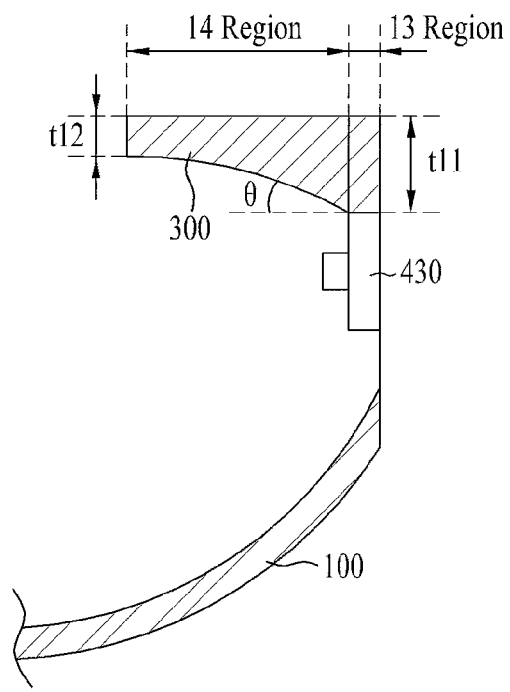

In other words, the third reflector 300 may have a thickness (t11) near the second light source module 430 and another thickness (t12) far from the second light source module 430 that is different from the thickness (t11). As shown in FIGS. 9a and 9b, the thickness (t11) of the region near the second light source module 430 may be larger than the thickness (t12) of another region far from the second light source module 430.

Figure 9C:
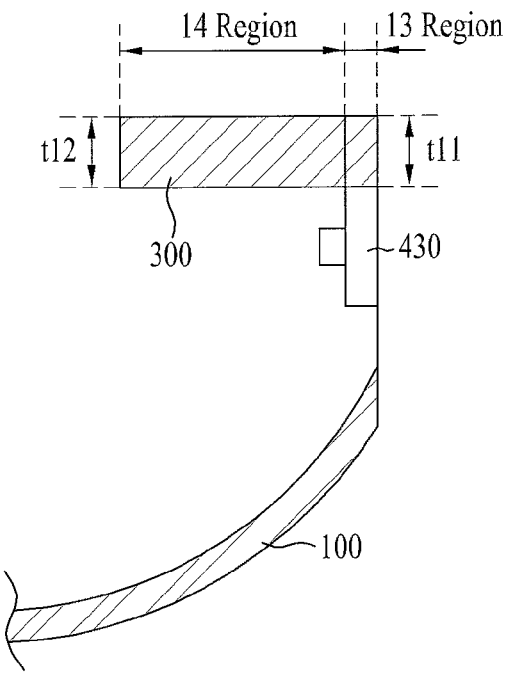
Figure 9D:
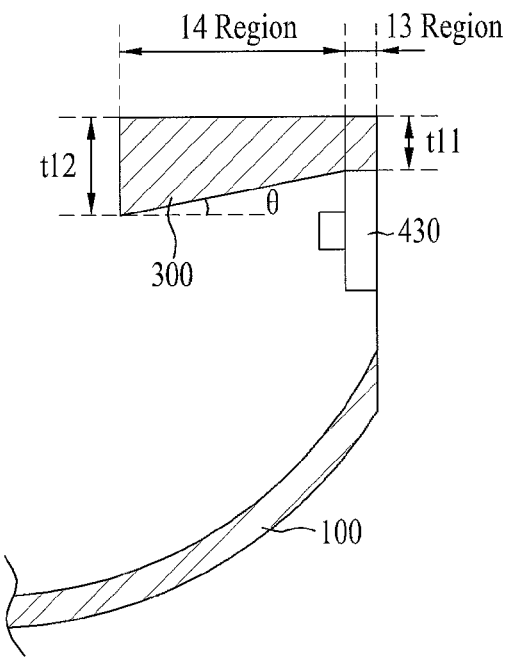
Figure 9E:
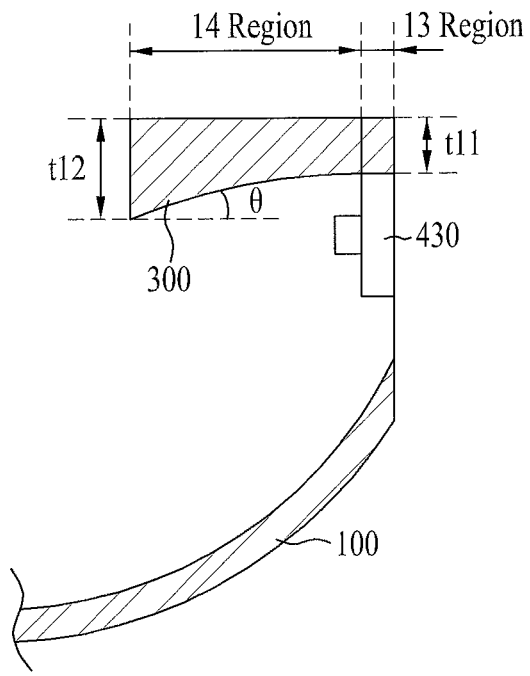

Alternatively, as shown in FIGS. 9d and 9e, the thickness (t11) near the second light source module 430 may be smaller than another thickness (t12) far from the second light source module 430.

As shown in FIG. 9c, the thickness (t11) of the region near the second light source module 430 may be identical to the thickness (t12) of the region far from the second light source module 430 in the third reflector 300.

A predetermined reflection pattern may be formed in the fourteenth region of the third reflector 300.

FIGS. 10a to 10d are sectional views illustrating the second reflector having a reflection pattern.

As shown in FIGS. 10a to 10d, a back surface of the second reflector 200 may have an eleventh region and a twelfth region. The first light source module 410 is arranged on the eleventh region of the second reflector 200 and the first light source module 410 is not arranged on the twelfth region of the second reflector 200.

In this instance, a predetermined reflection pattern may be formed in the twelfth region of the second reflector 200.

Figure 10A:
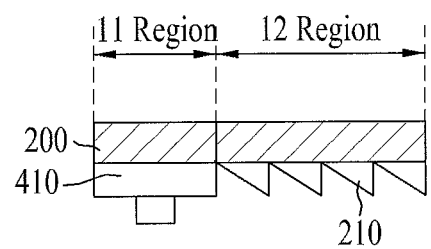
FIGS. 10a to 10d are sectional views illustrating a second reflector having a reflection pattern.
Figure 10B:
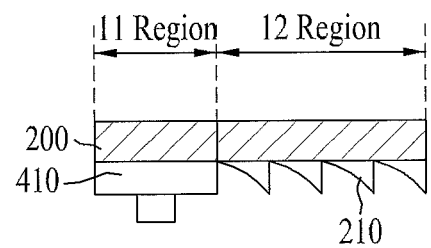
Figure 10C:
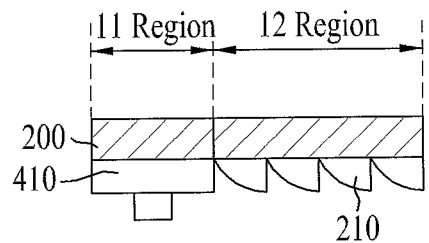

FIG. 10a shows that the reflection pattern 210 is sawtooth-shaped, with a flat surface. FIGS. 10b and 10c show that the reflection pattern 210 is sawtooth-shaped, with a curved surface.

FIG. 10b shows that the surface of the reflection pattern 210 is concavely curved and FIG. 10c shows that the reflection pattern 210 is convexly curved.

Figure 10D:
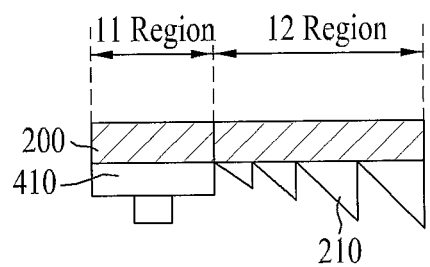

Alternatively, as shown in FIG. 10d, the size of the reflection pattern 210 may be gradually larger.

The reason why the reflection pattern 210 is formed on the second reflector 200 is not only to reflect the lights but also to achieve a light diffusion effect for diffusing the lights uniformly.

As a result, the size of such the reflection pattern 210 may be variably fabricated in a corresponding region, based on overall brightness distribution of the light.

FIGS. 11a to 11d are sectional views illustrating the third reflector having a reflection pattern.

As shown in FIGS. 11a to 11d, a back surface of the third reflector 300 may have a thirteenth region and a fourteenth region. The second light source module 430 is arranged on the thirteenth region of the third reflector 300 and the second light source module 430 is not arranged on the fourteenth region of the third reflector 300.

In this instance, a predetermined reflection pattern may be formed in the twelfth region of the second reflector 200.

Figure 11A:
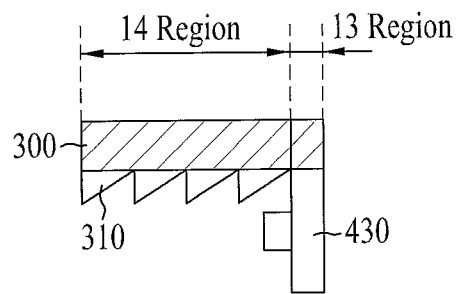
FIGS. 11a to 11d are sectional views illustrating a third reflector having a reflection pattern.
Figure 11B:
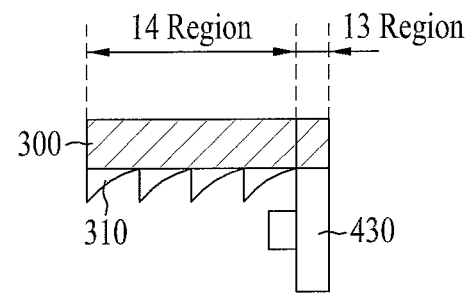
Figure 11C:
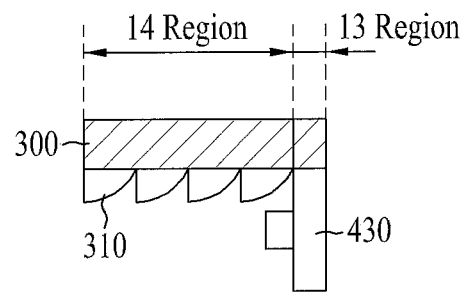

FIG. 11a shows that the reflection pattern 220 is sawtooth-shaped, with a flat surface. FIGS. 11b and 11c show that the reflection pattern 310 is sawtooth-shaped, with a curved surface.

FIG. 11b shows that the surface of the reflection pattern 310 is concavely curved and FIG. 11c shows that the reflection pattern 310 is convexly curved.

Figure 11D:
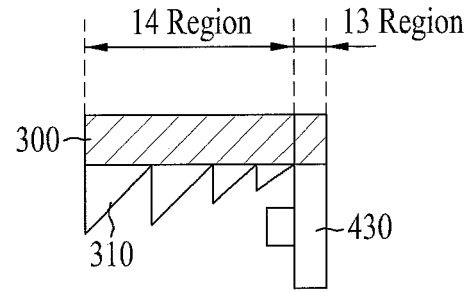

Alternatively, as shown in FIG. 11d, the size of the reflection pattern 310 may be gradually larger.

The reason why the reflection pattern 310 is formed on the third reflector 300 is not only to reflect the lights but also to achieve a light diffusion effect for diffusing the lights uniformly.

As a result, the size of such the reflection pattern 310 may be variably fabricated in a corresponding region, based on overall brightness distribution of the light.

FIGS. 12a to 12d are sectional views illustrating reflective surfaces of the second and third reflectors.

As shown in FIGS. 12a to 12d, a back surface of the second reflector 200 may have an eleventh region and a twelfth region. The first light source module 410 may be arranged on the eleventh region of the second reflector 200 and the first light source module 410 may not be arranged on the twelfth region of the second reflector 200.

A back surface of the third reflector 300 may have a thirteenth region and a fourteenth region. The second light source module 430 is arranged on the thirteenth region of the third reflector 300 and the second light source module 430 is not arranged on the fourteenth region of the third reflector 300.

Figure 12A:
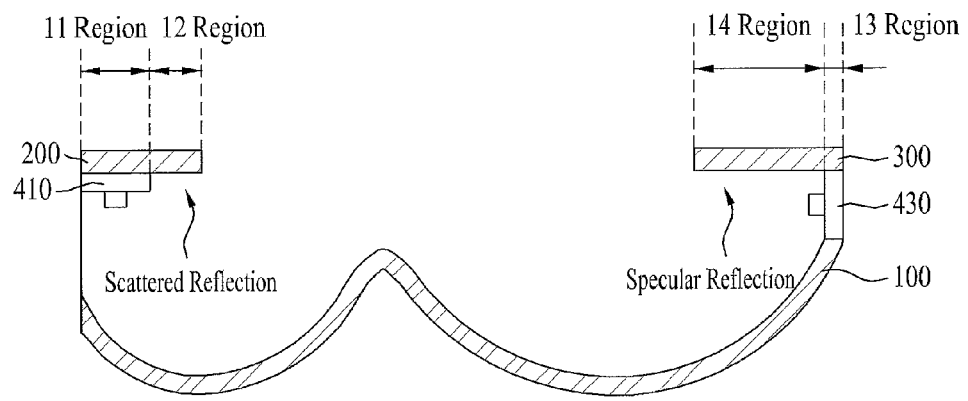
FIGS. 12a to 12d are sectional views illustrating reflective surfaces of the second and third reflectors.

In this instance, as shown in FIG. 12a, the twelfth region of the second reflector 200 may be a scattered reflection surface for scattered reflection of lights and the fourteenth region of the third reflector 300 may be a specular reflection surface for specular reflection of lights.

Figure 12B:
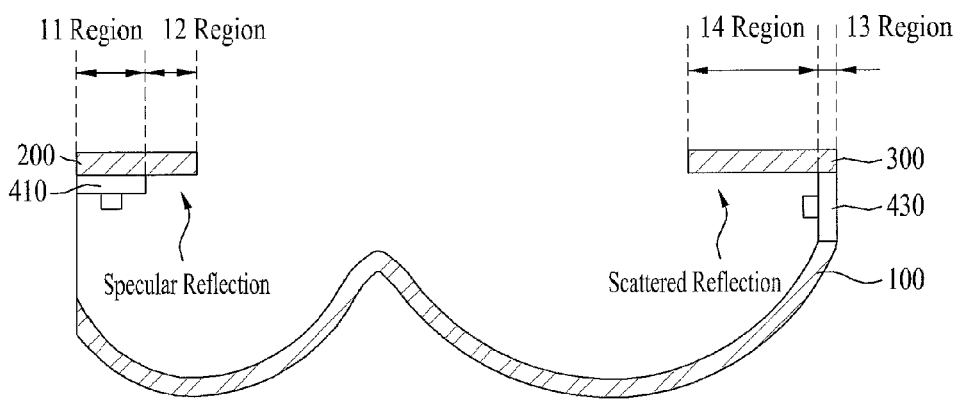

Alternatively, as shown in FIG. 12b, the twelfth region of the second reflector 200 may be a specular reflection surface for specular reflection of lights and the fourteenth region of the third reflector 300 may be a scattered reflection surface for scattered reflection of lights.

Figure 12C:
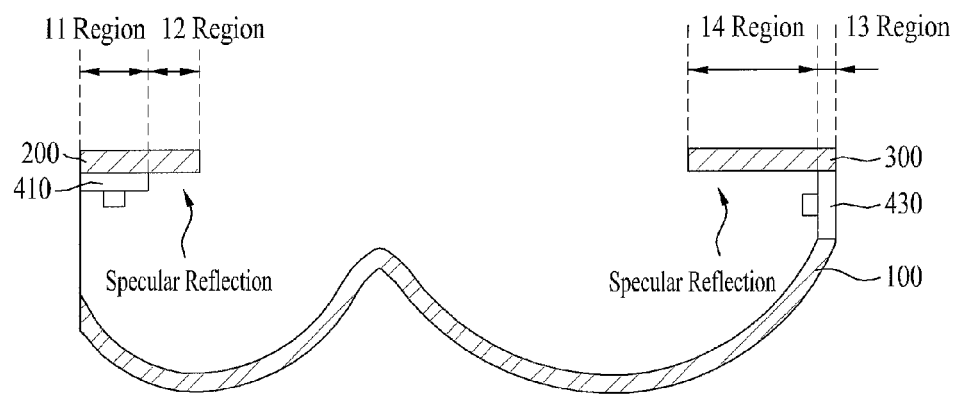
Figure 12D:
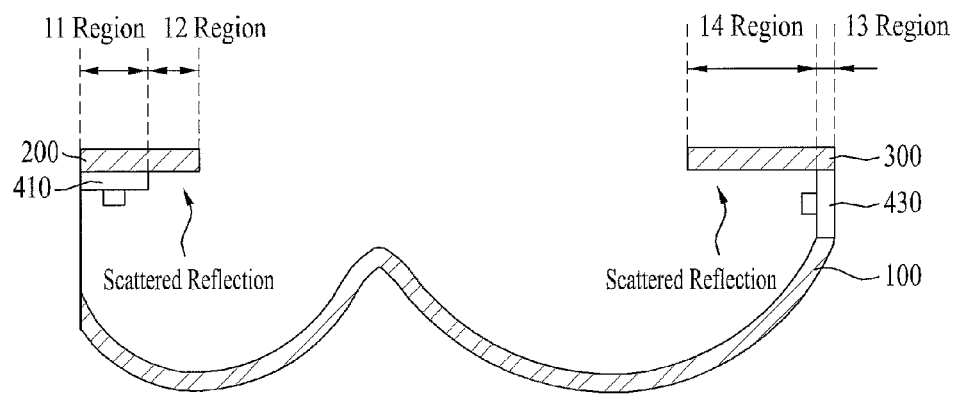

As shown in FIG. 12c, both the twelfth region of the second reflector 200 and the thirteenth region of the third reflector 300 may be specular reflection surfaces for specular reflection of lights. As shown in FIG. 12d, both the twelfth region of the second reflector 200 and the thirteenth region of the third reflector 300 may be scattered-reflection surfaces for scattered reflection of lights.

Figure 13:
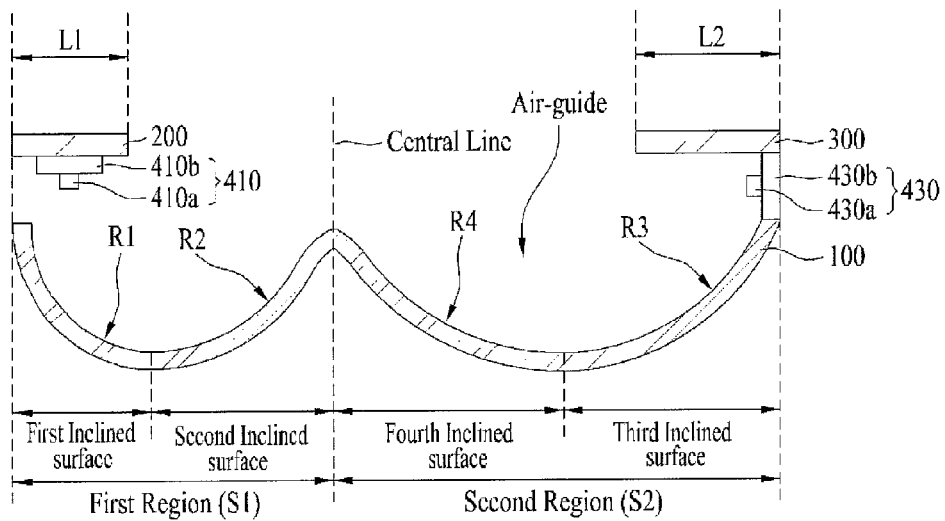
FIG. 13 is a sectional view illustrating a first reflector.

FIG. 13 is a sectional view illustrating the first reflector.

As shown in FIG. 13, the first reflector 100 may include a first region adjacent to the first light source module 410 and a second region adjacent to the second light source module 430.

In this instance, an area (S1) of the first region may be different from an area (S2) with respect to a central line of the first reflector 100. The area (S1) of the first region may be smaller than the area (S2) of the second region in the first reflector 100.

For example, the area (S2) of the second region may be larger than the area (S1) of the first region by approximately 1.1 to 2 times.

Also, the first region of the first reflector 100 may have a first inclined surface and a second inclined surface. The second region of the first reflector 100 may have a third inclined surface and a fourth inclined surface.

In this instance, the first inclined surface may be inclined downwardly, adjacent to the first light source module 410 and the second reflector 200. The second inclined surface may be inclined upwardly from the first inclined surface, adjacent to the first inclined surface.

The third inclined surface may be inclined downwardly, adjacent to the second light source module 430 and the third reflector 300. The fourth inclined surface may be inclined upwardly from the third inclined surface, adjacent to the third inclined surface.

An area (S11) of the first inclined surface may be different from an area (S12) of the second inclined surface. For example, the area (S11) of the first inclined surface may be smaller than the area (S12) of the second inclined surface.

Also, an area (S13) of the third inclined surface may be different from an area (S14) of the fourth inclined surface. For example, the area (S13) of the third inclined surface may be smaller than the area (S14) of the fourth inclined surface.

The first inclined surface may be a curved surface having a first curvature radius (R1) and the second inclined surface may be a curved surface having a second curvature radius (R2). The third inclined surface may be a curved surface having a third curvature radius (R3) and the fourth inclined surface may be a curved surface having a fourth curvature radius (R4).

The first curvature radius (R1) may be different from the third curvature radius (R3).

For example, the first curvature radius (R1) of the first inclined surface in the first region may be smaller than the third curvature radius (R3) of the third inclined surface in the second region.

Also, the second curvature radius (R2) of the second inclined surface may be different from the fourth curvature radius (R4) of the fourth inclined surface. For example, the second curvature radius (R2) of the second inclined surface in the first region may be smaller than the fourth curvature radius (R4) of the fourth inclined surface in the second region.

In addition, at least one of the first, second, third and fourth inclined surfaces may be concavely curved or convexly curved.

Also, the first curvature radius (R1) of the first inclined surface may be different from the second curvature radius (R2) of the second inclined surface. For example, the first curvature radius (R1) of the first inclined surface may be smaller than the second curvature radius (R2) of the second inclined surface in the first region.

The third curvature radius (R3) of the third inclined surface may be different from the fourth curvature radius (R4) of the fourth inclined surface. For example, the third curvature radius (R3) of the third inclined surface may be smaller than the fourth curvature radius (R4) of the fourth inclined surface in the second region.

The areas and curvature radii of the inclined surfaces positioned in the first region of the first reflector 100 may be in asymmetry with the areas and curvature radii of the inclined surfaces positioned in the second region of the first reflector 100.

A specular reflection sheet may be formed on each of the first and third inclined surfaces provided in the first reflector 100. At least one of specular reflection and scattered reflection sheets may be formed on the second and fourth inclined surfaces of the first reflector 100.

The reason why the specular reflection sheets are formed on the first and third inclined surfaces of the first reflector 100 is that uniform brightness can be provided by reflecting more lights toward the central region of the first reflector 100 that has weak brightness.

Also, the reason why the scattered reflection sheets are formed on the second and fourth inclined surfaces of the first reflector 100 is that brightness can be compensated by scatteredly reflecting lights from the second and fourth inclined surfaces of the first reflector 100 that have weak brightness.

The first reflector 100 may include metal or metallic oxide having a high reflectance such as Al, Au or TiO2. The materials composing the first, second, third and fourth inclined surfaces of the first reflector 100 may be different from each other. Surface roughness values of the first to fourth inclined surfaces may be different from each other.

In other words, the first, second and third inclined surfaces provided in the first reflector 100 may be formed of the same material, with different surface roughness values, respectively.

Alternatively, the first, second, third and fourth inclined surfaces provided in the first reflector 100 may be formed of different materials, respectively, with different surface roughness values.

As a result, the first and second light source modules may be arranged asymmetrically, to reduce the size of the bezel and to provide uniform brightness simultaneously.

Figure 14A:
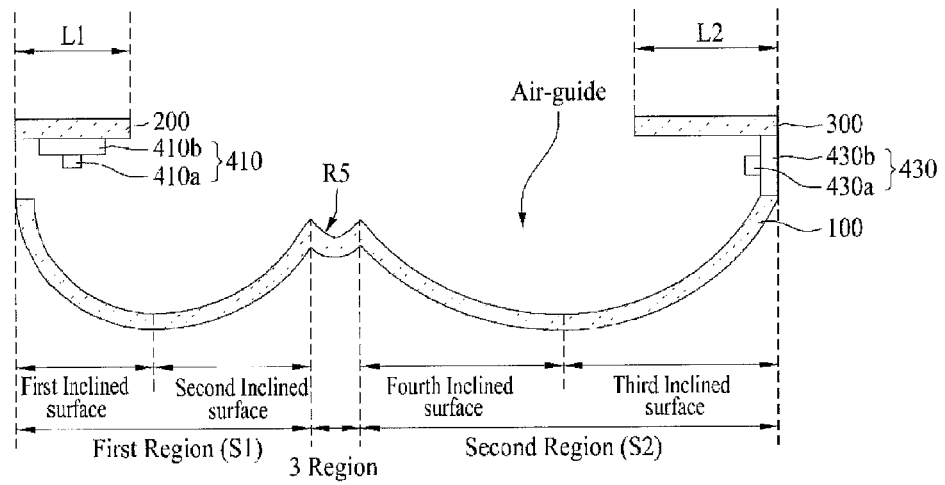
FIGS. 14a to 14c are sectional views illustrating a center region of the first reflector.
Figure 14B:
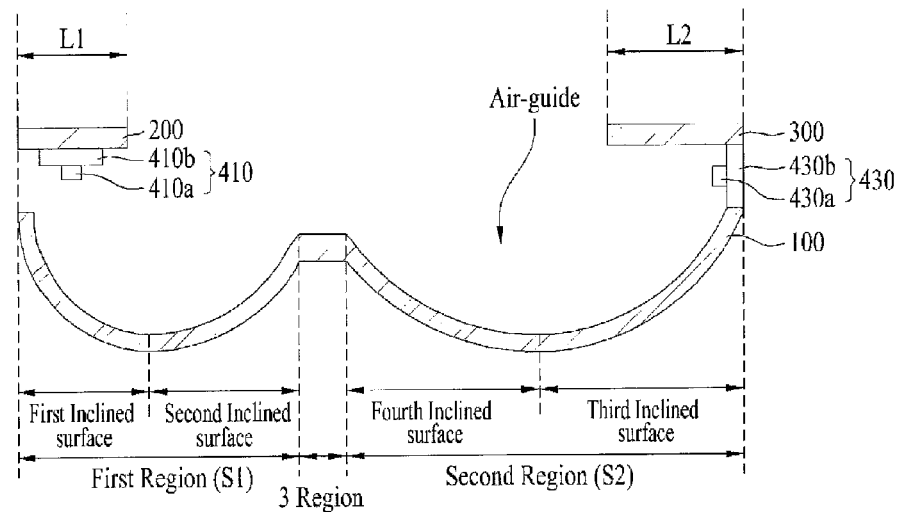
Figure 14C:
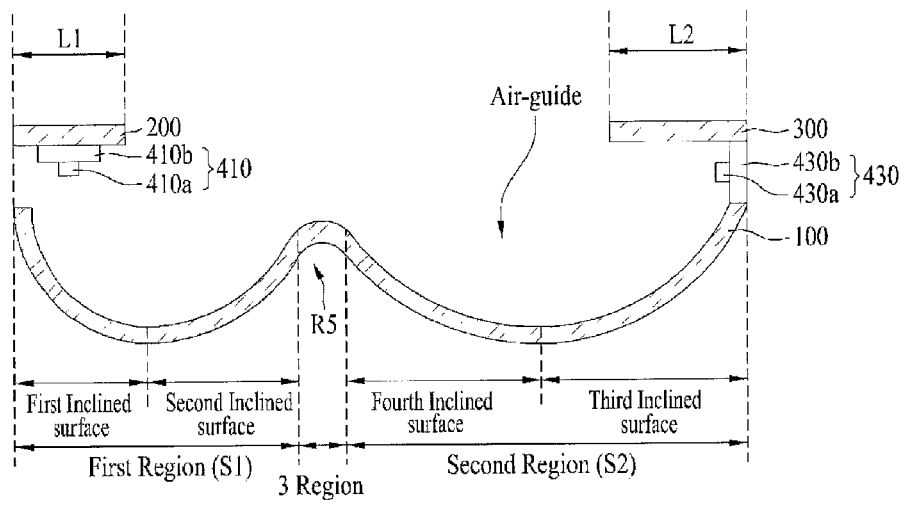

FIGS. 14a to 14c are sectional views illustrating a central region of the first reflector.

As shown in FIGS. 14a to 14c, the first reflector 100 may include a third region provided between the first region and the second region.

In this instance, the third region may be a flat surface or a curved surface having a fifth curvature radius (R5).

An area (S3) of the third region may be smaller than the area (S1) of the first region and the area (S2) of the second region.

At this time, the third region may be positioned in a central region of the first reflector 100. If the third region is acute-shaped, a hot spot might be generated by concentrated lights. Accordingly, the third region may be gentle-curvature-shaped and uniform brightness can be provided.

As shown in FIG. 14a, the third region of the first reflector 100 may be a concavely curved surface having a fifth curvature radius (R5).

Alternatively, as shown in FIG. 14b, the third region of the first reflector 100 may be a flat surface in parallel to the second and third reflectors.

As shown in FIG. 14c, the third region of the first reflector 100 may be a concavely curved surface having a fifth curvature radius (R5).

The third region of the first reflector 100 may be formed in the gently curved shape, without a projected area. Accordingly, the hot spot might be reduced and the uniform brightness may be enabled.

Figure 15:
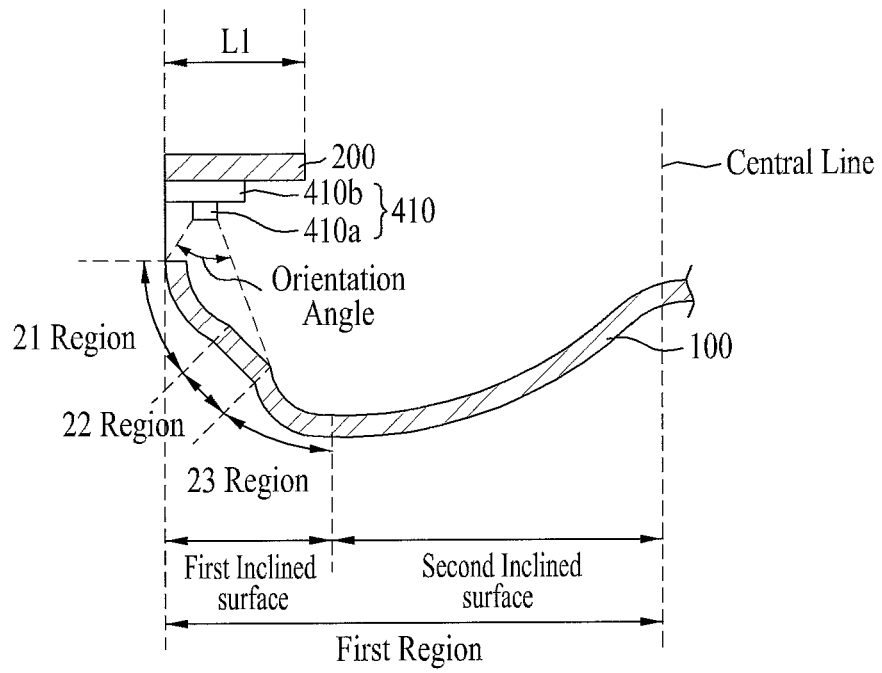
FIG. 15 is a sectional view illustrating a surface of the first reflector according to a light orientation angle of the first light source module.

FIG. 15 is a sectional view illustrating a surface of the first reflector according to an orientation angle of the first light source module.

As shown in FIG. 15, the first light source module 410 may be arranged on a surface of the second reflector that faces the first reflector 100.

In this instance, the first light source module 410 may include a first substrate 410b and a first light source 410a. A light emitting surface of the first light source 410a may be arranged toward the first reflector 100 and the first substrate 410b may be arranged in contact with the second reflector 200.

Also, the first region of the first reflector 100 may include a first inclined surface and a second inclined surface. The first inclined surface may be inclined downwardly, adjacent to the first light source module 410 and the second reflector 200. The second inclined surface may be inclined upwardly from the first inclined surface, adjacent to the first inclined surface.

The first inclined surface of the first reflector 100 may include a curved portion and a flat portion. The flat portion of the first inclined surface may be arranged within an orientation angle of the light emitted from the first light source module 410.

This is because the lights are concentrated on a central region of the first reflector 100 to make the brightness uniform.

For example, the first inclined surface of the first reflector 100 may include a twenty-first region, a twenty-second region and a twenty-third region. When the twenty-first region and the twenty-second region are located within the orientation angle of the light emitted from the first light source module 410, the flat portion of the first inclined surface may be positioned in the twenty-first region or the twenty-second region.

At this time, the flat portion of the first inclined surface may be a specular reflection surface.

The flat portion of the first inclined surface is arranged within the orientation angle of the light emitted from the first light source module 410. Accordingly, the lights may be concentrated on the central region of the first reflector 100 and the uniform brightness may be provided.

Figure 16A:
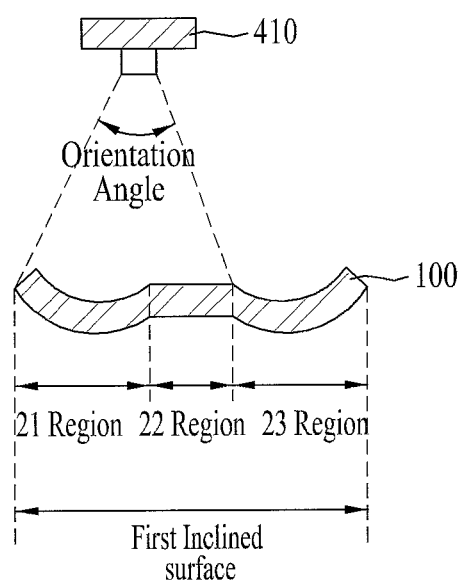
FIGS. 16a and 16b are sectional views illustrating a plane position of a first inclined surface provided in the first reflector.
Figure 16B:
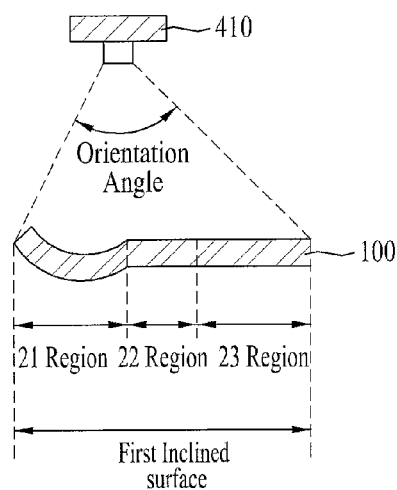

FIGS. 16*a* and 16*b* are sectional views illustrating the position of the flat portion formed in the first inclined surface of the first reflector.

As shown in FIG. 16*a*, the first inclined surface of the first reflector 100 may include a twenty-first region, a second twenty-second region and a twenty-third region.

In this instance, the twenty-first region and the twenty-second region may be positioned within the orientation angle of the light emitted from the first light source module 410. The twenty-first region of the first inclined surface may be a concavely curved surface and the twenty-second region of the first inclined surface may be a flat surface.

Alternatively, the twenty-first region of the first inclined surface may be a flat surface and the twenty-second region of the first inclined surface may be a concavely curved surface.

The twenty-third region of the first inclined surface positioned out of the orientation angle of the light emitted from the first light source module 410 may be a concave polished surface.

As shown in FIG. 16*b*, the twenty-first, twenty-second and twenty-third regions of the first inclined surface may be positioned within the orientation angle of the light emitting from the first light source module 410. The twenty-first region of the first inclined surface may be a concavely curved surface. The twenty-second and twenty-third regions of the first inclined surface may be flat surfaces.

Alternatively, the twenty-first region of the first inclined surface may be a flat surface and the twenty-second and twenty-third regions of the first inclined surface may be concavely curved surfaces.

The flat surface of the first inclined surface may be arranged within the orientation angle of the light emitted from the first light source module 410. Accordingly, the lights can be concentrated on the central region of the first reflector 100 and uniform brightness can be provided.

Figure 17:
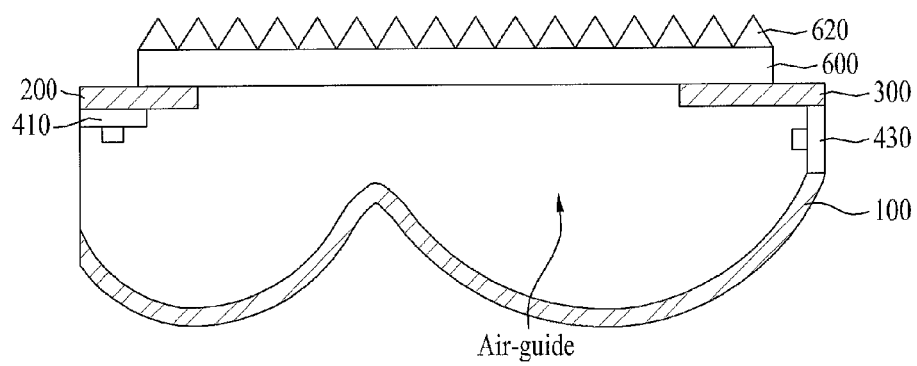
FIG. 17 is a diagram illustrating a light unit having an optical member arranged thereon.

FIG. 17 is a diagram illustrating a light unit having an optical member disposed thereon.

As shown in FIG. 17, an optical member 600 may be disposed, spaced apart a predetermined distance from the first reflector 100.

An air guide may be formed in a predetermined space formed between the first reflector 100 and the optical member 600.

In this instance, an unevenness pattern 620 may be formed on a top surface of the optical member 600.

The optical member 600 may be configured to disperse the light emitted from the first and second light source modules 410 and 430 and the unevenness pattern 620 may be formed to increase a light dispersion effect.

In other words, the optical member 600 may be configured of a plurality of layers and the unevenness pattern 620 may be provided on the uppermost layer or a surface of one of the layers.

The unevenness pattern 620 may have a strip shape arranged along the first and second light source modules 410 and 430.

At this time, the unevenness pattern 620 may include projected portions projected from the surface of the optical member 600 and each of the projected portions may be configured of a first surface and a second surface facing each other. An angle formed between the first surface and the second surface may be an acute angle or an obtuse angle.

Alternatively, the optical member 600 may be configured of at least one sheet and it may selectively include a diffusion sheet, a prism sheet or a brightness enhancement sheet.

In this instance, the diffusion sheet may diffuse the light emitted from the light source and the prism sheet may guide the diffused light toward a luminescence region. The brightness enhancement sheet may enhance brightness.

According to the embodiments described above, the reflectors for air-guide, with asymmetrical inclined surfaces may be formed, without a light guide plate. As a result, the weight of the display device may be reduced and the fabrication cost thereof may be low. Also, the hot spot may be reduced.

Furthermore, the light source modules facing each other may be arranged asymmetrically. The size of the bezel may be reduced and the hot spot may be reduced.

As a result, the economic feasibility and reliability of the light unit can be enhanced.

The first, second and third reflectors and the first and second light source modules may be applicable to a display device, a pointing device and an illumination system. For example, the illumination system may include a lamp and a streetlamp.

Such the illumination system may be used as a lighting lamp having a plurality of focused LEDs to gain lights. Especially, the illumination system may be used as a down light embedded in a ceiling or wall of a building, with an open part of a shade being exposed outside.

Figure 18:
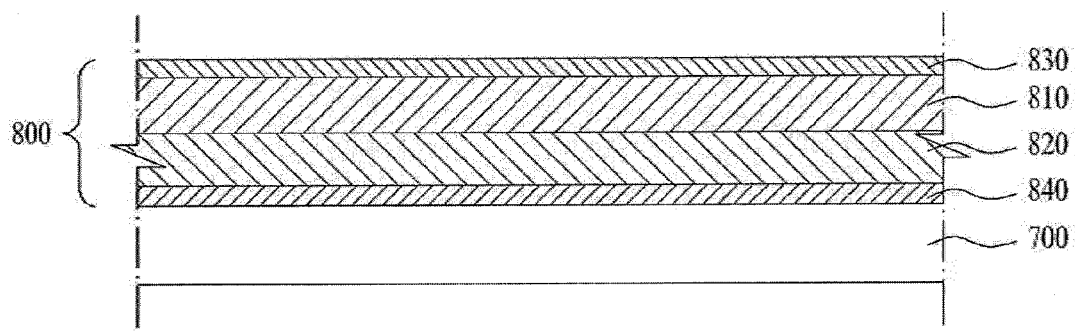
FIG. 18 is a diagram illustrating a display module having the light unit according to the embodiment.

FIG. 18 is a diagram illustrating a display module including the light unit according to the embodiments mentioned above.

As shown in FIG. 18, a display module 20 may include a display panel 800 and a light unit 700.

The display panel 800 may include a color filter substrate 810 and a thin film transistor substrate 820 (TFT) that are bonded to maintain a uniform cell gap, facing each other. A liquid crystal layer (not shown) may be disposed between the two substrates 810 and 820.

A top polarization plate 830 and a bottom polarization plate 840 may be disposed on and under the display panel 800, respectively. More specifically, the top polarization plate 830 may be disposed on a top surface of the color substrate 810 and the bottom polarization plate 840 may be disposed under the TFT substrate 820.

Although not shown in the drawings, gate and data driving parts may be provided in both sides next to the display panel 800 to generate a driving signal used to drive the panel 800.

Figure 19:
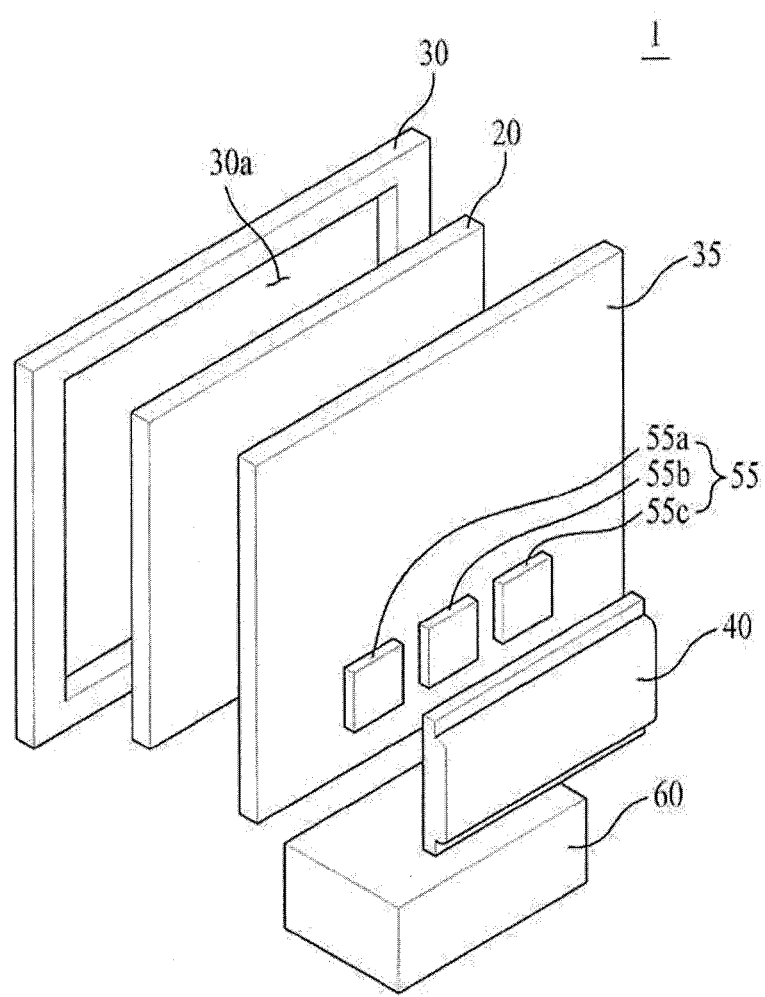
FIGS. 19 and 20 are diagrams illustrating a display device according to an embodiment.
Figure 20:
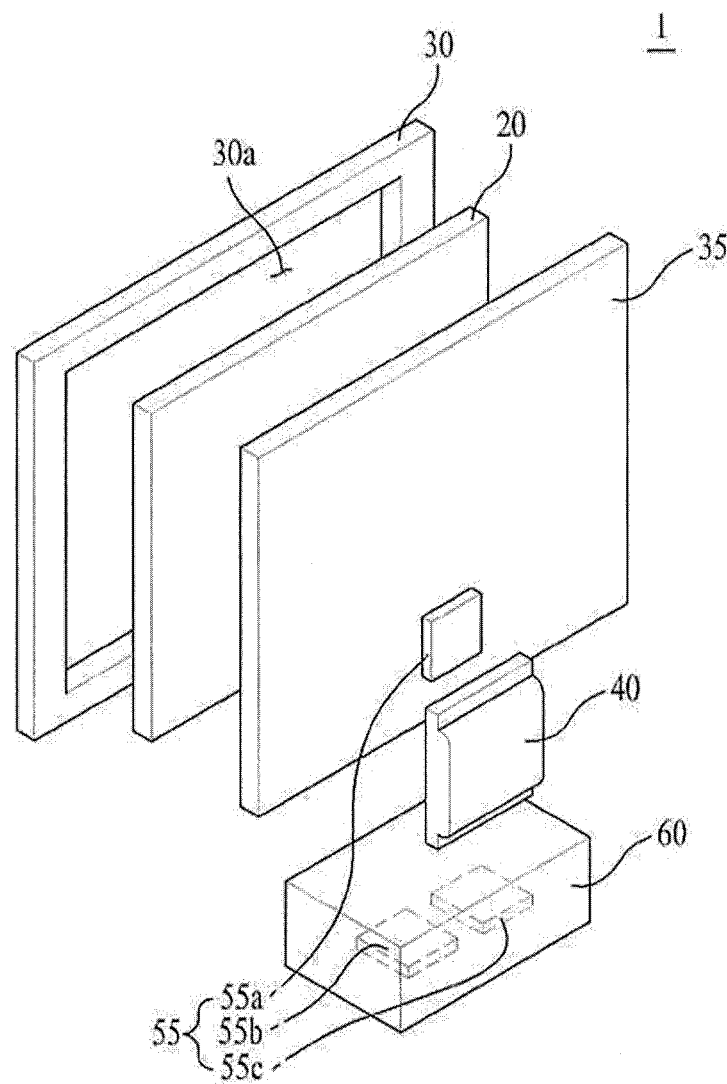

FIGS. 19 and 20 are diagrams illustrating a display device according to an embodiment.

In reference to FIG. 19, a display device 1 may include a display module 20, a front cover 30 and a back cover 35 surrounding the display module 20, a driving part 55 provided in the back cover 35 and a driving cover 40 surrounding the driving part 55.

The front cover 30 may include a front panel (not shown) formed of a transparent material to transmit lights therethrough. The front panel may protect the display module 20, spaced apart a predetermined distance from the display module 20, and transmit the light emitted from the display module 20 to enable an image displayed on the display module 20 visible outside.

The back cover 35 may be coupled to the front cover 30, to protect the display module 20.

The driving part 55 may be arranged on a surface of the back cover 35.

The driving part 55 may include a main control part 55a, a main board 55b and a power supply part 55c.

The driving control part 55a may be a timing controller and it may be driving part that adjusts an operation timing of each driver IC provided in the display module 20. The main board 55b may be a driving part that transmits V-synch, H-synch and R, G and B resolution signals to the timing controller. The power supply part 55c may be a driving part that applies an electric voltage to the display module 20.

The driving part 55 may be provided in the back cover 35 and it may be surrounded by the driving part cover 40.

A plurality of holes may be provided in the back cover 35, to connect the display module 20 and the driving part 55 with each other. A stand 60 may be provided in the back cover 35 to support the display device 1.

In contrast, as shown in FIG. 17, a driving control part 55a of the driving part may be provided in the back cover 35 and the power board 55c of the main board 55b may be provided in the stand 60.

The driving part cover 40 may cover only the driving part 55 provided in the back cover 35.

In this embodiment, the main board 55b and the power board 55c may be independently provided or they may compose a single integration board, and this embodiment is not be limited thereto.

Another embodiment may be a display device, a pointing device or a lighting system that includes the first and second reflectors and the light source module described in the embodiments. For example, the lighting system may include a lamp and a streetlamp.

Such the lighting system may be used as a lighting lamp having a plurality of light emitting diodes focused thereon to generate light. Especially, the lighting system may be used as a downlight mounted in a ceiling or wall of a building, with exposing an open portion of a shade.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light unit, comprising:
a first reflector comprising an inclined surface partially formed therein;
second and third reflectors arranged at both ends of the first reflector, respectively;
a first light source module disposed between the first reflector and the second reflector; and
a second light source module disposed between the first reflector and the third reflector,
wherein the first reflector comprises,
a first region provided to correspond to the first light source module;
a second region provided to correspond to the second light source module, an area of the first region being different from an area of the second region; and
a third region provided between the first region and the second region,
wherein the first region comprises,
a first inclined surface inclined downward from the first light source module; and
a second inclined surface inclined upward from the first inclined surface, one end of the second inclined surface contacting one end of the third region,
wherein the second region comprises,
a third inclined surface inclined downward from the second light source module; and
a fourth inclined surface inclined upward from the third inclined surface,
wherein one end of the fourth inclined surface contacts the other end of the third region and the other end of the fourth inclined surface contacts the third inclined surface, and
wherein a directionality of light from the first light source module is toward the first reflector from the second reflector, a directionality of light from the second light source module is toward the second reflector from the third reflector, and a length of the second reflector is different from a length of the third reflector.

2. The light unit according to claim 1, wherein an area of the third region is smaller than the areas of the first and second regions.

3. The light unit according to claim 1, wherein the first inclined surface is a curved surface having a first curvature radius, and the second inclined surface is a curved surface having a second curvature radius, and the third inclined surface is a curved surface having a third curvature radius, and the fourth inclined surface is a curved surface having a fourth curvature radius.

4. The light unit according to claim 1, wherein the third region is a curved surface having a fifth curvature radius.

5. The light unit according to claim 1, wherein the third region is a flat surface.

6. The light unit according to claim 5, wherein the flat surface of the third region is in parallel to the second and third reflectors.

7. The light unit according to claim 1, wherein the third region is positioned in a central region of the first reflector.

8. The light unit according to claim 1, wherein the third region is acute-shaped.

9. The light unit according to claim 1, wherein the third region is gentle-curvature shaped.

10. The light unit according to claim 9, wherein the first reflector has a gentle curvature between the first region and the third region, over the entire third region, and between the third region and the second region.

11. The light unit according to claim 1, wherein the third region is a concavely curved surface.

12. The light unit according to claim 1, wherein the second and third reflectors are provided over the first reflector in a prescribed direction.

13. The light unit according to claim 1, wherein the directionality of light from the first light source module is perpendicular to the directionality of light from the second light source module.

14. The light unit according to claim 1, further comprising:
an optical member disposed apart a predetermined distance from the first reflector,
wherein an air guide is formed in a space formed between the first reflector and the optical member.

15. The light unit according to claim 1, wherein the second and third reflectors are parallel to each other, the second reflector facing the first region of the first reflector and the third reflector facing the second region of the first reflector.

16. The light unit according to claim 1, wherein the first light module includes a first LED provided on a first substrate and the second light source module includes a second LED provided on a second substrate, the first substrate facing the first reflector and the second substrate not facing the first reflector.

17. The light unit according to claim 1, wherein the area of the first region of the first reflector is greater than the area of the second region of the first reflector, and an amount of light directed toward the first region by the first light source module is greater than an amount of light directed toward the second region by the second light source module.

* * * * *